United States Patent
Hsieh et al.

(10) Patent No.: US 8,780,466 B2
(45) Date of Patent: Jul. 15, 2014

(54) OPTICAL IMAGE CAPTURING SYSTEM

(71) Applicant: Largan Precision Co., Ltd., Taichung (TW)

(72) Inventors: Dung-Yi Hsieh, Taichung (TW); Tsung-Han Tsai, Taichung (TW); Hsin-Hsuan Huang, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 150 days.

(21) Appl. No.: 13/657,064

(22) Filed: Oct. 22, 2012

(65) Prior Publication Data
US 2013/0286486 A1 Oct. 31, 2013

(30) Foreign Application Priority Data
Apr. 27, 2012 (TW) ............................. 101115167 A

(51) Int. Cl.
| | | |
|---|---|---|
| *G02B 9/60* | (2006.01) | |
| *G02B 13/18* | (2006.01) | |
| *G02B 3/02* | (2006.01) | |
| *G02B 13/08* | (2006.01) | |

(52) U.S. Cl.
CPC . *G02B 9/60* (2013.01); *G02B 13/08* (2013.01)
USPC .......................................... 359/766; 359/714

(58) Field of Classification Search
CPC .... G02B 13/002; G02B 13/0045; G02B 9/60; G02B 13/18
USPC .................................... 359/764, 766, 767, 714
See application file for complete search history.

(56) References Cited

U.S. PATENT DOCUMENTS

2010/0315723 A1* 12/2010 Noda ............................ 359/714

* cited by examiner

*Primary Examiner* — Alicia M Harrington
(74) *Attorney, Agent, or Firm* — CKC & Partners Co., Ltd.

(57) ABSTRACT

An optical image capturing system includes, in order from an object side to an image side, a first lens element, a second lens element, a third lens element, a fourth lens element and a fifth lens element and each of the first through fifth lens elements is single and non-cemented. The first lens element with positive refractive power has a convex object-side surface and a concave image-side surface. The second lens element has refractive power. The third lens element has positive refractive power. The fourth lens element with negative refractive power has a concave object-side surface and a convex image-side surface, and the surfaces of the fourth lens element are aspheric. The fifth lens element with refractive power has a concave image-side surface, and the surfaces of the fifth lens element are aspheric. The fifth lens element has at least one inflection point formed on the image-side surface thereof.

24 Claims, 24 Drawing Sheets

OPTICAL IMAGE CAPTURING SYSTEM

RELATED APPLICATIONS

The application claims priority to Taiwan Application Serial Number 101115167, filed Apr. 27, 2012, which is herein incorporated by reference.

BACKGROUND

1. Technical Field

The present disclosure relates to an optical image capturing system. More particularly, the present disclosure relates to a compact optical image capturing system applicable to electronic products and three-dimensional (3D) image applications thereof.

2. Description of Related Art

In recent years, with the popularity of mobile products with camera functionalities, the demand for a miniaturized optical lens assembly is increasing. The sensor of a conventional photographing camera is typically a CCD (Charge-Coupled Device) image sensor or a CMOS (Complementary Metal-Oxide Semiconductor) sensor. As advanced semiconductor manufacturing technologies have allowed the pixel size of sensors to be reduced and compact optical lens assemblies have gradually evolved toward the field of higher megapixels, there is an increasing demand for optical lens assemblies featuring better image quality.

A conventional compact optical lens assembly employed in a portable electronic product mainly adopts a four-element lens structure such as the one disclosed in U.S. Pat. No. 7,869,142. Due to the popularity of mobile products with high-end specifications, such as smart phones and PDAs (Personal Digital Assistants), the pixel and image-quality requirements of the compact optical lens assembly have increased rapidly. However, the conventional four-element lens structure cannot satisfy the requirements of the compact optical lens assembly with high-end specifications.

Another conventional optical lens assembly with five-element lens structure such as the one disclosed in U.S. Pat. No. 7,911,711 which provides better image quality and higher resolution. However, since the lens element adjacent to the object side has stronger refractive power, and the lens element adjacent to the image side has weaker refractive power, a larger refraction angle is apt to be generated when the incident light enters the optical lens assembly. More stray light of the optical lens assembly is thereby generated. Besides, the surface design of this optical lens assembly results in excessive astigmatism at the peripheral region and the asymmetry of the optical lens assembly. Thus, the image brightness of the optical lens assembly is reduced and the image quality of the optical lens assembly is constrained.

SUMMARY

According to one aspect of the present disclosure, an optical image capturing system includes, in order from an object side to an image side, a first lens element, a second lens element, a third lens element, a fourth lens element and a fifth lens element and each of the first through fifth lens elements is a single and non-cemented lens element. The first lens element with positive refractive power has a convex object-side surface and a concave image-side surface. The second lens element has refractive power. The third lens element has positive refractive power. The fourth lens element with negative refractive power has a concave object-side surface and a convex image-side surface, wherein the object-side surface and the image-side surface of the fourth lens element are aspheric. The fifth lens element with refractive power has a concave image-side surface, wherein an object-side surface and the image-side surface of the fifth lens element are aspheric, and the fifth lens element has at least one inflection point on the image-side surface thereof. When a focal length of the first lens element is f1, a focal length of the second lens element is f2, a focal length of the third lens element is f3, a focal length of the fourth lens element is f4, a focal length of the optical image capturing system is f, and a curvature radius of the object-side surface of the fourth lens element is R7, the following relationships are satisfied:

$0<|f3/f1|+|f4/f2|<1.0$; and $-1.0<R7/f<0$.

According to another aspect of the present disclosure, an optical image capturing system includes, in order from an object side to an image side, a first lens element, a second lens element, a third lens element, a fourth lens element and a fifth lens element and each of the first through fifth lens elements is a single and non-cemented lens element. The first lens element with positive refractive power has a convex object-side surface. The second lens element has refractive power. The third lens element with positive refractive power has a convex image-side surface. The fourth lens element with negative refractive power has a concave object-side surface and a convex image-side surface, wherein the object-side surface and the image-side surface of the fourth lens element are aspheric. The fifth lens element with refractive power has a concave image-side surface, wherein an object-side surface and the image-side surface of the fifth lens element are aspheric, and the fifth lens element has at least one inflection point on the image-side surface thereof. When a focal length of the first lens element is f1, a focal length of the second lens element is f2, a focal length of the third lens element is f3, a focal length of the fourth lens element is f4, a focal length of the optical image capturing system is f, and a curvature radius of the object-side surface of the fourth lens element is R7, the following relationships are satisfied:

$0<|f3/f1|+|f4/f2|<0.75$; and $-1.0<R7/f<0$.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
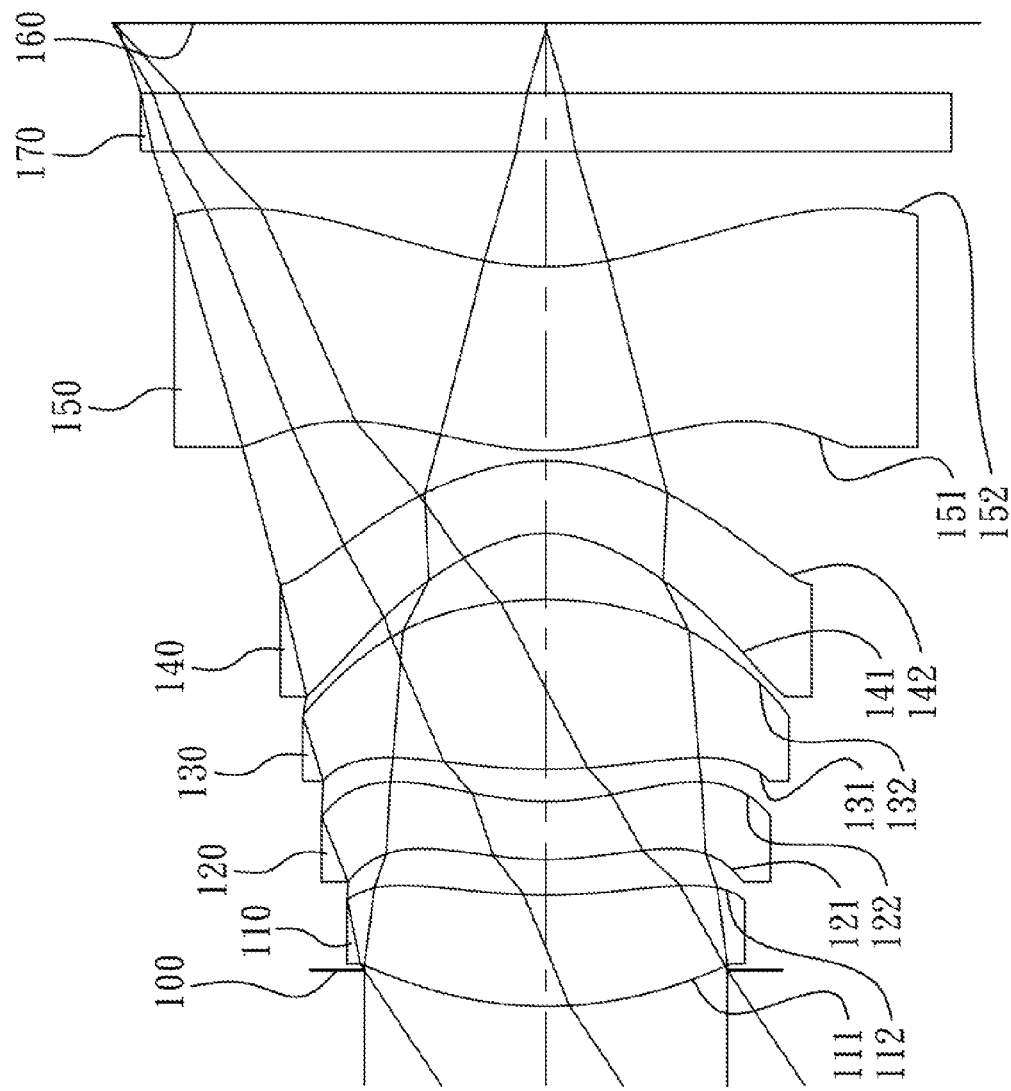
FIG. 1 is a schematic view of an optical image capturing system according to the 1st embodiment of the present disclosure.

An optical image capturing system includes, in order from an object side to an image side, a first lens element, a second lens element, a third lens element, a fourth lens element and a fifth lens element. From the first lens element to the fifth lens element are five non-cemented lens elements. That is, any two lens elements adjacent to each other are not cemented, and there is an air space between the two lens elements. Moreover, the manufacturing process of the cemented lenses is more complex than the non-cemented lenses. In particular, a second surface of one lens and a first surface of the following lens need to have accurate curvature to ensure these two lens elements will be highly cemented. However, during the cementing process, those two lens elements might not be highly cemented due to displacement and it is thereby not favorable for the image quality of the optical image capturing system. Therefore, the optical image capturing system of the present disclosure provides five non-cemented lens elements for improving the problem generated by the cemented lens elements.

The first lens element with positive refractive power has a convex object-side surface and a concave image-side surface favorable for properly adjusting the positive refractive power of the first lens element and it is thereby favorable for reducing the total track length of the optical image capturing system.

The second lens element can have a convex object-side surface and a concave image-side surface, so that the astigmatism of the optical image capturing system can be reduced. The object-side surface of the second lens element changes from convex at a paraxial region to concave at a peripheral region, and the image-side surface of the second lens element changes from concave at a paraxial region to convex at a peripheral region. Therefore, the angle at which the incident light projects onto the image sensor from the off-axis field can be effectively reduced and the aberration can be corrected as well.

The third lens element can have positive refractive power which can thereby provide the required positive refractive power for the optical image capturing system, so that the sensitivity of the optical image capturing system can be reduced and the manufacturing yield can be enhanced. When the third lens element has a convex image-side surface, the distribution of the positive refractive power of the optical image capturing system can be properly arranged.

The fourth lens element with negative refractive power can correct the offset of the incident light at different wavelength region. The fourth lens element has a concave object-side surface so as to effectively control the angle of the incident light from a peripheral region so that the astigmatism at the peripheral region of the optical image capturing system can be reduced. The fourth lens element has a convex image-side surface, so that the symmetry of the optical image capturing system can be increased for correcting the aberration thereof, and the angle of the incident light from the peripheral region can be reduced. Therefore, the image brightness and the image quality at the peripheral region can be enhanced.

The fifth lens element can have positive refractive power and has a concave image-side surface. Therefore, a principal point of the optical image capturing system can be positioned away from the image plane, and the total track length of the optical image capturing system can be reduced so as to maintain the compact size thereof. Furthermore, when the fifth lens element has a convex object-side surface, the high order aberration of the optical image capturing system can be corrected for increasing the image quality. Moreover, the fifth lens element has at least one inflection point on the image-side surface thereof, so that the angle at which the incident light projects onto the image sensor from the off-axis field can be effectively reduced and the aberration can be corrected as well.

When a focal length of the first lens element is f1, a focal length of the second lens element is f2, a focal length of the third lens element is f3, and a focal length of the fourth lens element is f4, the following relationship is satisfied: $0<|f3/f1|+|f4/f2|<1.0$. Therefore, the lens element adjacent to the object side has weaker refractive power, and the lens element adjacent to the image side has stronger refractive power.

Thus, when the incident light enters the optical image capturing system, a smaller refraction angle is produced for reducing the stray light. Preferably, f1, f2, f3 and f4 can satisfy the following relationship: 0<|f3/f1|+|f4/f2|<0.75.

When a focal length of the optical image capturing system is f, and a curvature radius of the object-side surface of the fourth lens element is R7, the following relationship is satisfied: −1.0<R7/f<0. Therefore, the astigmatism at the peripheral region of the optical image capturing system can be corrected by properly adjusting the curvature radius of the fourth lens element. Preferably, R7 and f can also satisfy the following relationship: −0.4<R7/f<0.

When the focal length of the optical image capturing system is f, and the focal length of the second lens element is f2, the following relationship is satisfied: 0<|f/f2|<0.36. Therefore, the aberration generated from the first lens element with positive refractive power can be corrected by properly adjusting the refractive power of the second lens element.

When an Abbe number of the third lens element is V3, and an Abbe number of the fourth lens element is V4, the following relationship is satisfied: 0.30<V4/V3<0.50. Therefore, the chromatic aberration of the optical image capturing system can be corrected.

When a curvature radius of the image-side surface of the third lens element is R6, and a central thickness of the third lens element is CT3, the following relationship is satisfied: −2.7<R6/CT3<−1.0. Therefore, it is favorable for forming and assembling the lens elements of the optical image capturing system by adjusting the thickness and the shape of the image-side surface of the third lens element.

When an axial distance between the object-side surface of the first lens element and the image-side surface of the fifth lens element is Td, the following relationship is satisfied: 1.0 mm<Td<2.8 mm. Therefore, the total track length of the optical image capturing system can be reduced for maintaining the compact size thereof. Preferably, Td can satisfy the following relationship: 1.0 mm<Td≤2.4 mm.

When the focal length of the optical image capturing system is f, and the focal length of the fourth lens element is f4, the following relationship is satisfied: −1.2<f/f4<−0.5. Therefore, when the third lens element has positive refractive and the fourth lens element has negative refractive power, a positive-negative telephoto structure can be consequently obtained, which is favorable to reduce the back focal length as well as the total track length of the optical image capturing system and thereby it is favorable to correct the offset of the focusing light at different wavelength region for better image quality.

When an Abbe number of the second lens element is V2, the Abbe number of the third lens element is V3, and the Abbe number of the fourth lens element is V4, the following relationship is satisfied: 0.6<(V2+V4)/V3<1.0. Therefore, the chromatic aberration of the optical image capturing system can be corrected.

When the focal length of the optical image capturing system is f, and an entrance pupil diameter of the optical image capturing system is EPD, the following relationship is satisfied: 1.2<f/EPD<2.1. Therefore, it is favorable to acquire sufficient incident light for the system which is the feature of the big aperture and for enhancing the sensing efficiency of an image sensor under insufficient lighting condition, thus the shallow depth of field can be obtained.

According to the optical image capturing system of the present disclosure, the lens elements thereof can be made of plastic material or glass. When the lens elements are made of glass material the allocation of the refractive power of the optical image capturing system may be more flexible and easier to design. When the lens elements are made of plastic material, the manufacturing cost can be effectively reduced. Furthermore, the surface of each lens element can be aspheric, so that it is easier to make the surface into non-spherical shapes. As a result, more controllable variables are obtained, and the aberration is reduced, and the number of required lens elements can be reduced while constructing an optical system. Therefore, the total track length of the optical image capturing system can also be reduced.

According to the optical image capturing system of the present disclosure, each of an object-side surface and an image-side surface of every lens element has a paraxial region and a peripheral region. The paraxial region refers to the region of the surface where light rays travel close to an optical axis and the peripheral region refers to the region of the surface where light rays travel away from the optical axis. Particularly, when a lens element has a convex surface, it indicates that the surface is convex at the paraxial region; and when the lens element has a concave surface, it indicates that the surface is concave at the paraxial region.

According to the optical image capturing system of the present disclosure, there can be at least one stop provided, such as an aperture stop, a glare stop, or a field stop. Said glare stop or said field stop is allocated for reducing the stray light and thereby improving the image resolution thereof. Furthermore, an aperture stop can be configured as a front stop or a middle stop. A front stop can provide a longer distance from an exit pupil of the system to an image plane and thereby the generated telecentric effect improves the image-sensing efficiency of an image sensor. A middle stop is favorable for enlarging the field of view of the system and thereby provides a wider field of view for the same.

According to the above description of the present disclosure, the following 1st-12th specific embodiments are provided for further explanation.

1st Embodiment

Figure 2:
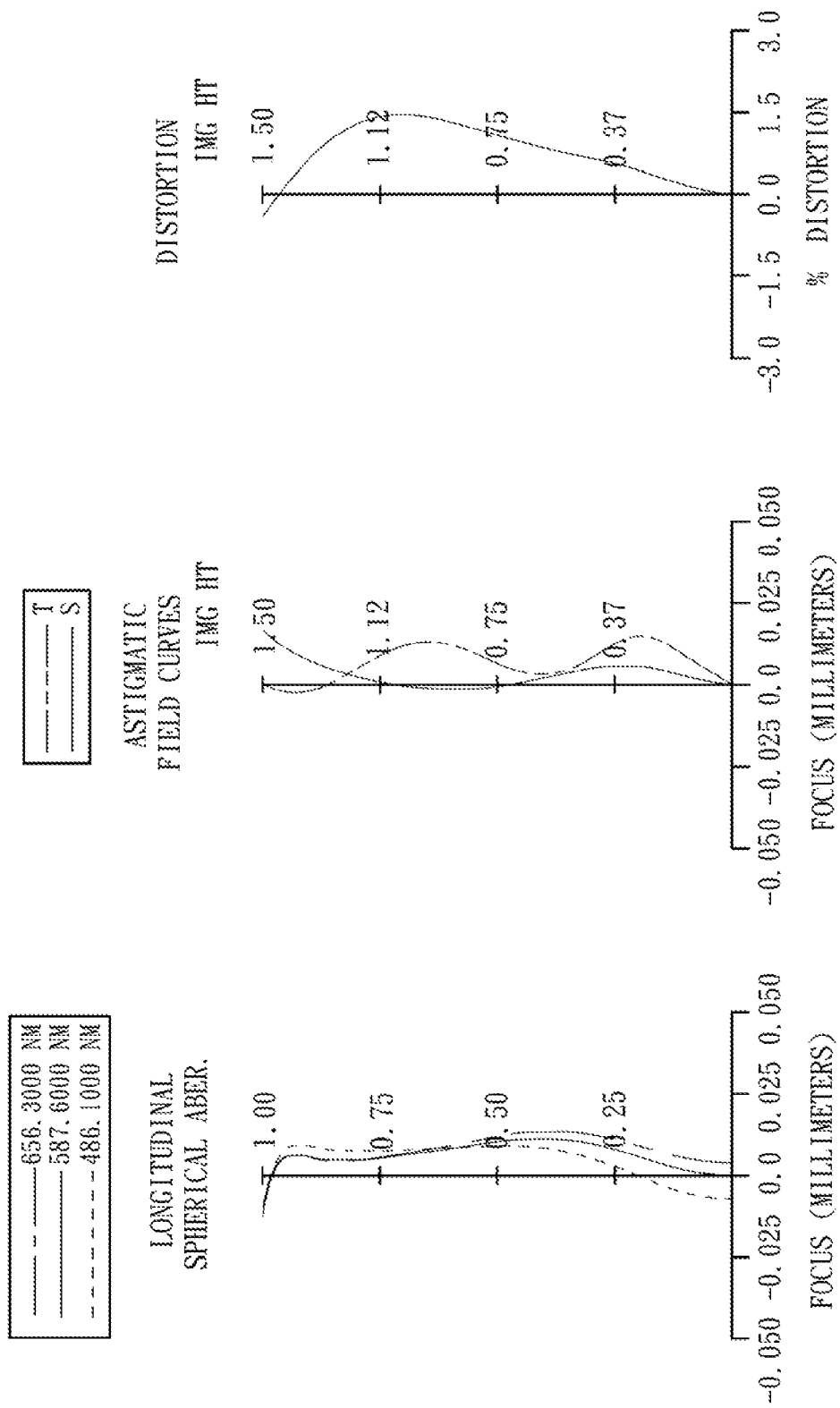
FIG. 2 shows spherical aberration curves, astigmatic field curves and a distortion curve of the optical image capturing system according to the 1st embodiment.

FIG. 1 is a schematic view of an optical image capturing system according to the 1st embodiment of the present disclosure. FIG. 2 shows spherical aberration curves, astigmatic field curves and a distortion curve of the optical image capturing system according to the 1st embodiment. In FIG. 1, the optical image capturing system includes, in order from an object side to an image side, an aperture stop 100, a first lens element 110, a second lens element 120, a third lens element 130, a fourth lens element 140, a fifth lens element 150, an IR-cut filter 170, and an image plane 160.

The first lens element 110 with positive refractive power has a convex object-side surface 111 and a concave image-side surface 112. The first lens element 110 is made of plastic material and has the object-side surface 111 and the image-side surface 112 being aspheric.

The second lens element 120 with negative refractive power has a convex object-side surface 121 and a concave image-side surface 122. The second lens element 120 is made of plastic material and has the object-side surface 121 and the image-side surface 122 being aspheric. Furthermore, the object-side surface 121 of the second lens element 120 changes from convex at a paraxial region to concave at a peripheral region, and the image-side surface 122 of the second lens element 120 changes from concave at a paraxial region to convex at a peripheral region.

The third lens element 130 with positive refractive power has a convex object-side surface 131 and a convex image-side surface 132. The third lens element 130 is made of plastic material and has the object-side surface 131 and the image-side surface 132 being aspheric.

The fourth lens element 140 with negative refractive power has a concave object-side surface 141 and a convex image-side surface 142. The fourth lens element 140 is made of plastic material and has the object-side surface 141 and the image-side surface 142 being aspheric.

The fifth lens element 150 with positive refractive power has a convex object-side surface 151 and a concave image-side surface 152. The fifth lens element 150 is made of plastic material and has the object-side surface 151 and the image-side surface 152 being aspheric. Furthermore, the fifth lens element 150 has at least one inflection point on the image-side surface 152 thereof.

The IR-cut filter 170 is made of glass material, wherein the IR-cut filter 170 is located between the fifth lens element 150 and the image plane 160, and will not affect the focal length of the optical image capturing system.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

wherein,

X is the relative distance of a point on the aspheric surface spaced at a distance Y from the optical axis relative to the tangential plane at the aspheric surface vertex on the optical axis;

Y is the distance from the point on the curve of the aspheric surface to the optical axis;

R is the curvature radius;

k is the conic coefficient; and

Ai is the i-th aspheric coefficient.

In the optical image capturing system according to the 1st embodiment, when a focal length of the optical image capturing system is f, an f-number of the optical image capturing system is Fno, and half of the maximal field of view is HFOV, these parameters have the following values:

f=2.25 mm:
Fno=1.80; and
HFOV=33.6 degrees.

In the optical image capturing system according to the 1st embodiment, when an Abbe number of the second lens element 120 is V2, an Abbe number to of the third lens element 130 is V3, and an Abbe number of the fourth lens element 140 is V4, the following relationships are satisfied:

$V4/V3=0.42$; and $(V2+V4)/V3=0.83$.

In the optical image capturing system according to the 1st embodiment, when a curvature radius of the image-side surface 132 of the third lens element 130 is R6, and a central thickness of the third lens element 130 is CT3, the following relationship is satisfied:

$R6/CT3=-2.14$.

In the optical image capturing system according to the 1st embodiment, when the focal length of the optical image capturing system is f, and a curvature radius of the object-side surface 141 of the fourth lens element 140 is R7, the following relationship is satisfied:

$R7/f=-0.18$.

In the optical image capturing system according to the 1st embodiment, when the focal length of the optical image capturing system is f, a focal length of the first lens element 110 is f1, a focal length of the second lens element 120 is f2, a focal length of the third lens element 130 is f3, and a focal length of the fourth lens element 140 is f4, the following relationships are satisfied:

$|f/f2|=0.236$;

$f/f4=-0.950$; and $|f3/f1|+|f4/f2|=0.462$.

In the optical image capturing system according to the 1st embodiment, when the focal length of the optical image capturing system is f, and an entrance pupil diameter of the optical image capturing system is EPD, the to following relationship is satisfied:

$f/EPD=1.80$.

In the optical image capturing system according to the 1st embodiment, when an axial distance between the object-side surface 111 of the first lens element 110 and the image-side surface 152 of the fifth lens element 150 is Td, the following relationship is satisfied:

$Td=2.55$ mm.

The detailed optical data of the 1st embodiment are shown in Table 1 and the aspheric surface data are shown in Table 2 below.

TABLE 1

1st Embodiment
f = 2.25 mm, Fno = 1.80, HFOV = 33.6 deg.

| Surface # |           | Curvature Radius |       | Thickness | Material | Index | Abbe # | Focal length |
|-----------|-----------|------------------|-------|-----------|----------|-------|--------|--------------|
| 0         | Object    | Plano            |       | Infinity  |          |       |        |              |
| 1         | Ape. Stop | Plano            |       | -0.124    |          |       |        |              |
| 2         | Lens 1    | 1.372            | (ASP) | 0.384     | Plastic  | 1.544 | 55.9   | 7.06         |
| 3         |           | 1.923            | (ASP) | 0.123     |          |       |        |              |
| 4         | Lens 2    | 1.204            | (ASP) | 0.200     | Plastic  | 1.640 | 23.3   | -9.55        |
| 5         |           | 0.941            | (ASP) | 0.109     |          |       |        |              |
| 6         | Lens 3    | 1.969            | (ASP) | 0.588     | Plastic  | 1.544 | 55.9   | 1.51         |
| 7         |           | -1.258           | (ASP) | 0.228     |          |       |        |              |
| 8         | Lens 4    | -0.415           | (ASP) | 0.250     | Plastic  | 1.640 | 23.3   | -2.37        |
| 9         |           | -0.705           | (ASP) | 0.036     |          |       |        |              |
| 10        | Lens 5    | 0.909            | (ASP) | 0.632     | Plastic  | 1.544 | 55.9   | 4.91         |
| 11        |           | 1.041            | (ASP) | 0.400     |          |       |        |              |

TABLE 1-continued

1st Embodiment
f = 2.25 mm, Fno = 1.80, HFOV = 33.6 deg.

| Surface # | | Curvature Radius | Thickness | Material | Index | Abbe # | Focal length |
|---|---|---|---|---|---|---|---|
| 12 | IR-cut filter | Plano | 0.200 | Glass | 1.517 | 64.2 | — |
| 13 | | Plano | 0.244 | | | | |
| 14 | Image | Plano | — | | | | |

Reference wavelength (d-line) is 587.6 nm.

TABLE 2

Aspheric Coefficients

| Surface # | 2 | 3 | 4 | 5 | 6 |
|---|---|---|---|---|---|
| k = | −5.3491E−01 | −3.0000E+01 | −1.0391E+01 | −5.5835E+00 | −2.1354E+01 |
| A4 = | −3.0628E−02 | −1.3787E−01 | −7.0989E−01 | −6.5512E−01 | −7.2741E−02 |
| A6 = | 2.9527E−01 | −2.6469E−01 | −2.3733E−01 | 3.2511E−01 | −4.2778E−01 |
| A8 = | −1.8476E+00 | −2.8982E−01 | 1.3079E+00 | −6.2376E−01 | −2.1413E−01 |
| A10 = | 4.6810E+00 | −1.2064E+00 | −6.2759E+00 | −5.5261E−01 | 7.5821E−01 |
| A12 = | −5.4952E+00 | 6.1352E−01 | 4.4486E+00 | 7.4160E−01 | −1.7640E+00 |
| A14 = | 8.5519E−02 | −1.2268E−01 | 7.8495E−02 | −3.0236E−01 | 1.9706E+00 |
| A16 = | | | | | −1.8180E+00 |

| Surface # | 7 | 8 | 9 | 10 | 11 |
|---|---|---|---|---|---|
| k = | −3.1963E−01 | −2.5791E+00 | −7.7446E−01 | −8.4250E+00 | −4.8793E+00 |
| A4 = | −1.6475E−01 | −3.0664E−01 | 4.9501E−01 | −2.5297E−01 | −1.1951E−01 |
| A6 = | 5.3229E−02 | −5.7110E−01 | −5.5834E−01 | 1.7260E−02 | 2.0933E−02 |
| A8 = | −7.7508E−01 | 1.3781E+00 | 2.9618E−01 | −7.4009E−02 | −1.1167E−02 |
| A10 = | 4.0123E−01 | −1.5110E+00 | 3.3761E−01 | 3.4758E−02 | 1.0392E−02 |
| A12 = | 2.4886E+00 | 1.0429E+00 | −1.9702E−01 | 3.1877E−02 | −5.6153E−03 |
| A14 = | −2.5229E+00 | 2.2227E+00 | −2.9144E−01 | 3.3125E−02 | 1.2907E−03 |
| A16 = | | −2.7471E+00 | 3.4863E−01 | −2.6133E−02 | |

In Table 1, the curvature radius, the thickness and the focal length are shown in millimeters (mm). Surface numbers 0-14 represent the surfaces sequentially arranged from the object-side to the image-side along the optical axis. In Table 2, k represents the conic coefficient of the equation of the aspheric surface profiles. A1-A16 represent the aspheric coefficients ranging from the 1st order to the 16th order. This information related to Table 1 and Table 2 applies also to the Tables for the remaining embodiments, and so an explanation in this regard will not be provided again.

2nd Embodiment

Figure 3:
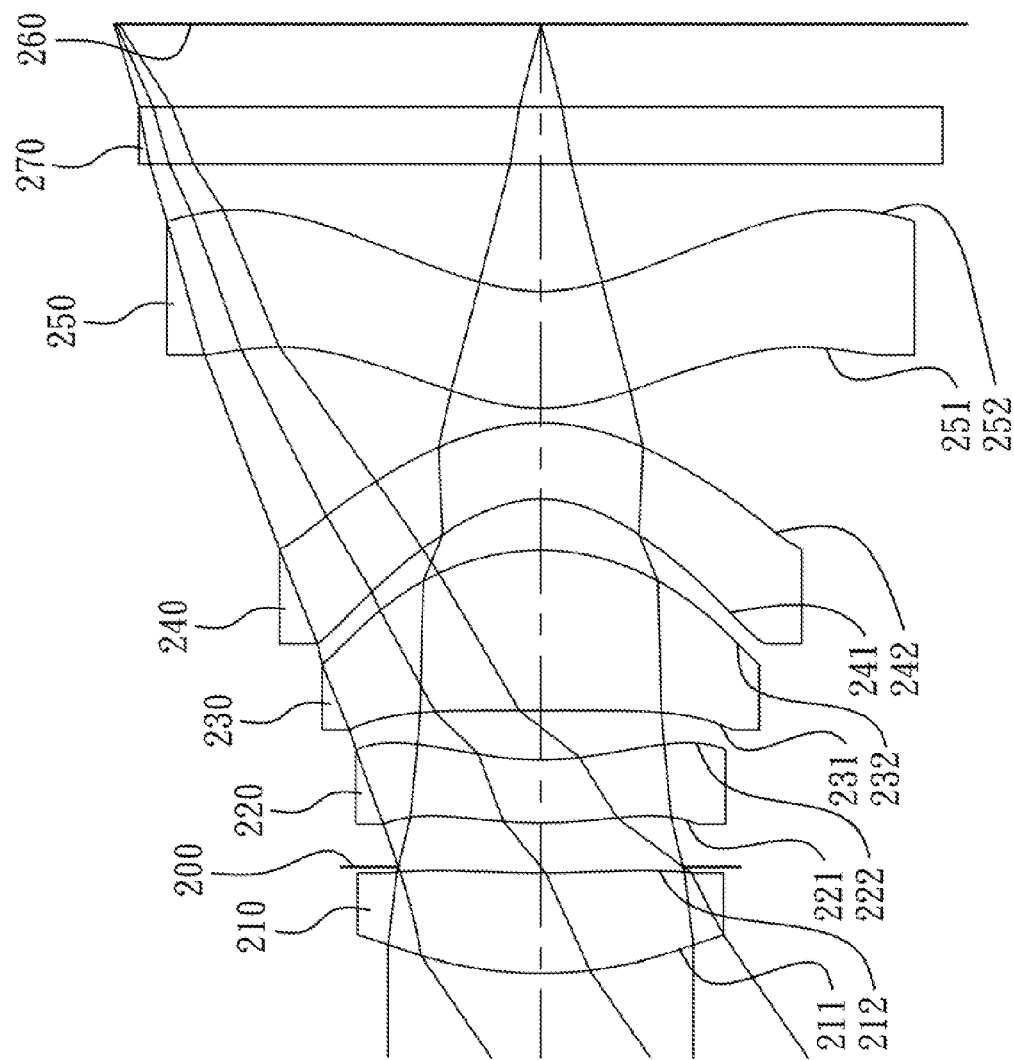
FIG. 3 is a schematic view of an optical image capturing system according to the 2nd embodiment of the present disclosure.
Figure 4:
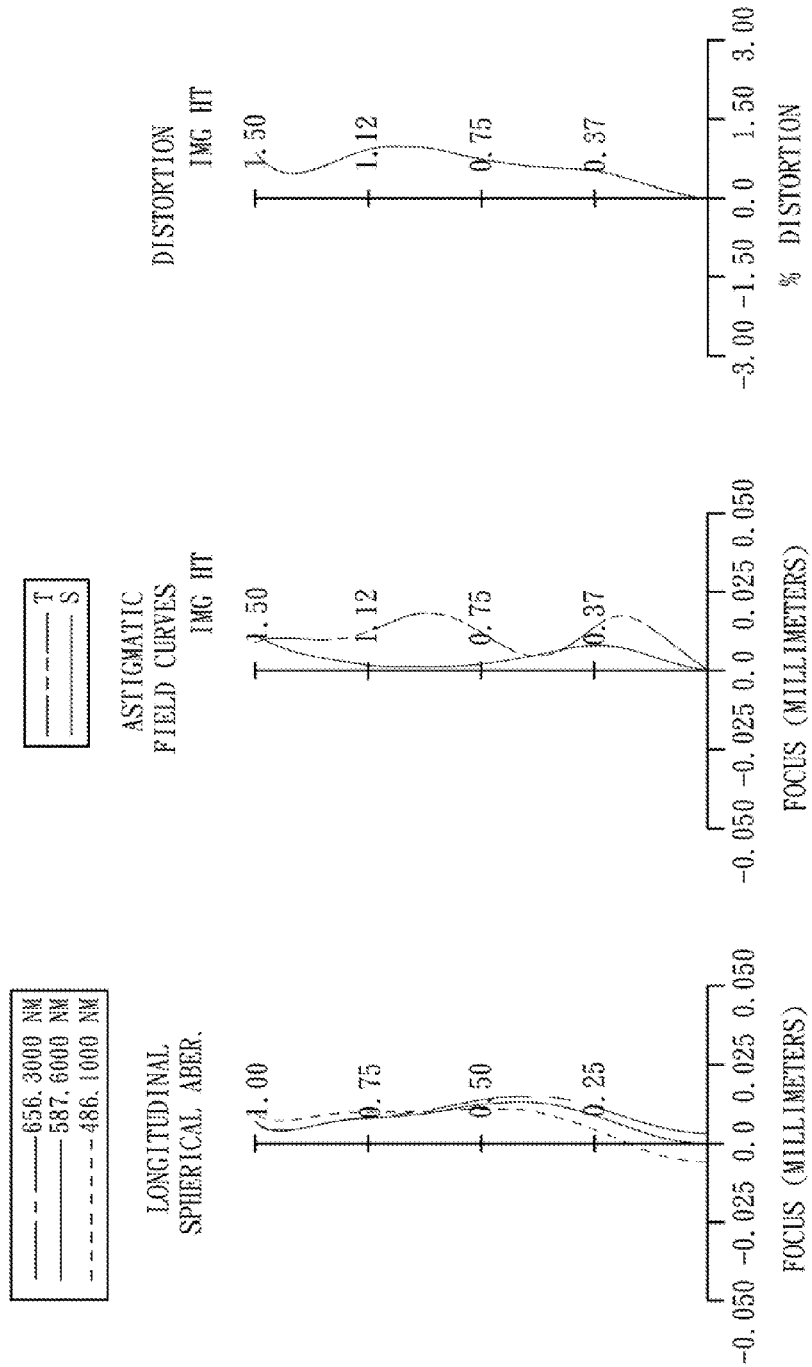
FIG. 4 shows spherical aberration curves, astigmatic field curves and a distortion curve of the optical image capturing system according to the 2nd embodiment.

FIG. 3 is a schematic view of an optical image capturing system according to the 2nd embodiment of the present disclosure. FIG. 4 shows spherical aberration curves, astigmatic field curves and a distortion curve of the optical image capturing system according to the 2nd embodiment. In FIG. 3, the optical image capturing system includes, in order from an object side to an image side, a first lens element 210, an aperture stop 200, a second lens element 220, a third lens element 230, a fourth lens element 240, a fifth lens element 250, an IR-cut filter 270, and an image plane 260.

The first lens element 210 with positive refractive power has a convex object-side surface 211 and a concave image-side surface 212. The first lens element 210 is made of plastic material and has the object-side surface 211 and the image-side surface 212 being aspheric.

The second lens element 220 with negative refractive power has a convex object-side surface 221 and a concave image-side surface 222. The second lens element 220 is made of plastic material and has the object-side surface 221 and the image-side surface 222 being aspheric. Furthermore, the object-side surface 221 of the second lens element 220 changes from convex at a paraxial region to concave at a peripheral region, and the image-side surface 222 of the second lens element 220 changes from concave at a paraxial region to convex at a peripheral region.

The third lens element 230 with positive refractive power has a convex object-side surface 231 and a convex image-side surface 232. The third lens element 230 is made of plastic material and has the object-side surface 231 and the image-side surface 232 being aspheric.

The fourth lens element 240 with negative refractive power has a concave object-side surface 241 and a convex image-side surface 242. The fourth lens element 240 is made of plastic material and has the object-side surface 241 and the image-side surface 242 being aspheric.

The fifth lens element 250 with positive refractive power has a convex object-side surface 251 and a concave image-side surface 252. The fifth lens element 250 is made of plastic material and has the object-side surface 251 and the image-side surface 252 being aspheric. Furthermore, the fifth lens element 250 has at least one inflection point on the image-side surface 252 thereof.

The IR-cut filter 270 is made of glass material, wherein the IR-cut filter 270 is located between the fifth lens element 250 and the image plane 260, and will not affect the focal length of the optical image capturing system.

The detailed optical data of the 2nd embodiment are shown in Table 3 and the aspheric surface data are shown in Table 4 below.

TABLE 3

2nd Embodiment
f = 2.15 mm, Fno = 2.00, HFOV = 34.6 deg.

| Surface # | | Curvature Radius | | Thickness | Material | Index | Abbe # | Focal length |
|---|---|---|---|---|---|---|---|---|
| 0 | Object. | Plano | | Infinity | | | | |
| 1 | Lens 1 | 1.459 | (ASP) | 0.354 | Plastic | 1.544 | 55.9 | 3.87 |
| 2 | | 4.352 | (ASP) | 0.021 | | | | |
| 3 | Ape. Stop | Plano | | 0.155 | | | | |
| 4 | Lens 2 | 1.505 | (ASP) | 0.220 | Plastic | 1.640 | 23.3 | −7.58 |
| 5 | | 1.083 | (ASP) | 0.175 | | | | |
| 6 | Lens 3 | 39.531 | (ASP) | 0.565 | Plastic | 1.544 | 55.9 | 1.50 |
| 7 | | −0.828 | (ASP) | 0.179 | | | | |
| 8 | Lens 4 | −0.405 | (ASP) | 0.270 | Plastic | 1.640 | 23.3 | −2.34 |
| 9 | | −0.700 | (ASP) | 0.050 | | | | |
| 10 | Lens 5 | 0.675 | (ASP) | 0.413 | Plastic | 1.544 | 55.9 | 5.16 |
| 11 | | 0.697 | (ASP) | 0.450 | | | | |
| 12 | IR-cut filter | Plano | | 0.200 | Glass | 1.517 | 64.2 | — |
| 13 | | Plano | | 0.292 | | | | |
| 14 | Image | Plano | | — | | | | |

Reference wavelength (d-line) is 587.6 nm.

TABLE 4

Aspheric Coefficients

| Surface # | 1 | 2 | 4 | 5 | 6 |
|---|---|---|---|---|---|
| k = | −6.2192E−01 | −2.0000E+01 | −1.6062E+01 | −4.4827E+00 | 3.0000E+00 |
| A4 = | −2.9742E−02 | −4.8158E−01 | −7.1867E−01 | −7.0118E−01 | −2.2049E−01 |
| A6 = | 2.6533E−01 | 7.1396E−01 | −4.9176E−01 | 2.6721E−01 | −2.2309E−01 |
| A8 = | −1.5283E+00 | −3.2923E−01 | 1.1025E+00 | 5.8664E−02 | −6.9893E−01 |
| A10 = | 3.8530E+00 | −6.6338E+00 | −1.4214E+00 | −4.1550E−01 | 1.4619E+00 |
| A12 = | −5.5945E+00 | 1.1145E+01 | −3.5607E+00 | −2.5957E+00 | 1.9991E+00 |
| A14 = | 8.5519E−02 | −1.2268E−01 | 7.8495E−02 | 1.2022E+00 | −5.5296E+00 |
| A16 = | | | | | −1.8180E+00 |

| Surface # | 7 | 8 | 9 | 10 | 11 |
|---|---|---|---|---|---|
| k = | −4.3019E−01 | −2.6255E+00 | −8.0209E−01 | −4.5587E+00 | −3.4835E+00 |
| A4 = | −4.1581E−02 | −3.7304E−01 | 5.3442E−01 | −1.4983E−01 | −1.3912E−01 |
| A6 = | 6.2816E−02 | −2.9473E−01 | −5.8200E−01 | −2.4688E−02 | 1.7041E−02 |
| A8 = | −6.2561E−01 | 1.2909E+00 | 2.7485E−01 | −1.6952E−02 | −1.3492E−02 |
| A10 = | 4.4269E−01 | −1.7665E+00 | 2.4143E−01 | 4.0204E−02 | 1.2988E−02 |
| A12 = | 2.2883E+00 | 7.5144E−01 | −1.8962E−01 | −8.7455E−03 | −8.0565E−03 |
| A14 = | −1.4380E+00 | 2.1889E+00 | −1.6680E−01 | −1.7185E−04 | 2.4015E−03 |
| A16 = | | −1.3320E+00 | 2.5583E−01 | 1.1246E−04 | |

In the optical image capturing system according to the 2nd embodiment, the definitions of f, Fno, HFOV, V2, V3, V4, R6, R7, CT3, f1, f2, f3, f4, EPD and Td are the same as those stated in the 1st embodiment with corresponding values for the 2nd embodiment. Moreover, these parameters can be calculated from Table 3 and Table 4 as the following values and satisfy the following relationships:

| f (mm) | 2.15 | R7/f | −0.19 |
|---|---|---|---|
| Fno | 2.00 | |f/f2| | 0.284 |
| HFOV (deg.) | 34.6 | f/f4 | −0.919 |
| V4/V3 | 0.42 | |f3/f1| + |f4/f2| | 0.696 |
| (V2 + V4)/V3 | 0.83 | f/EPD | 2.00 |
| R6/CT3 | −1.47 | Td (mm) | 2.40 |

3rd Embodiment

Figure 5:
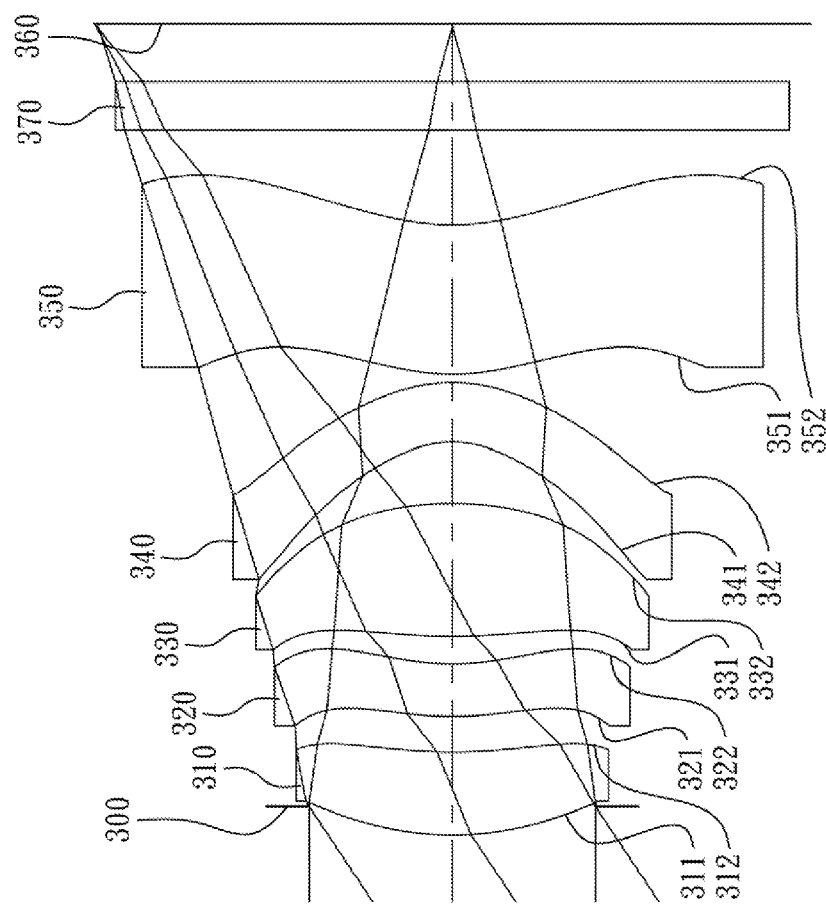
FIG. 5 is a schematic view of an optical image capturing system according to the 3rd embodiment of the present disclosure.
Figure 6:
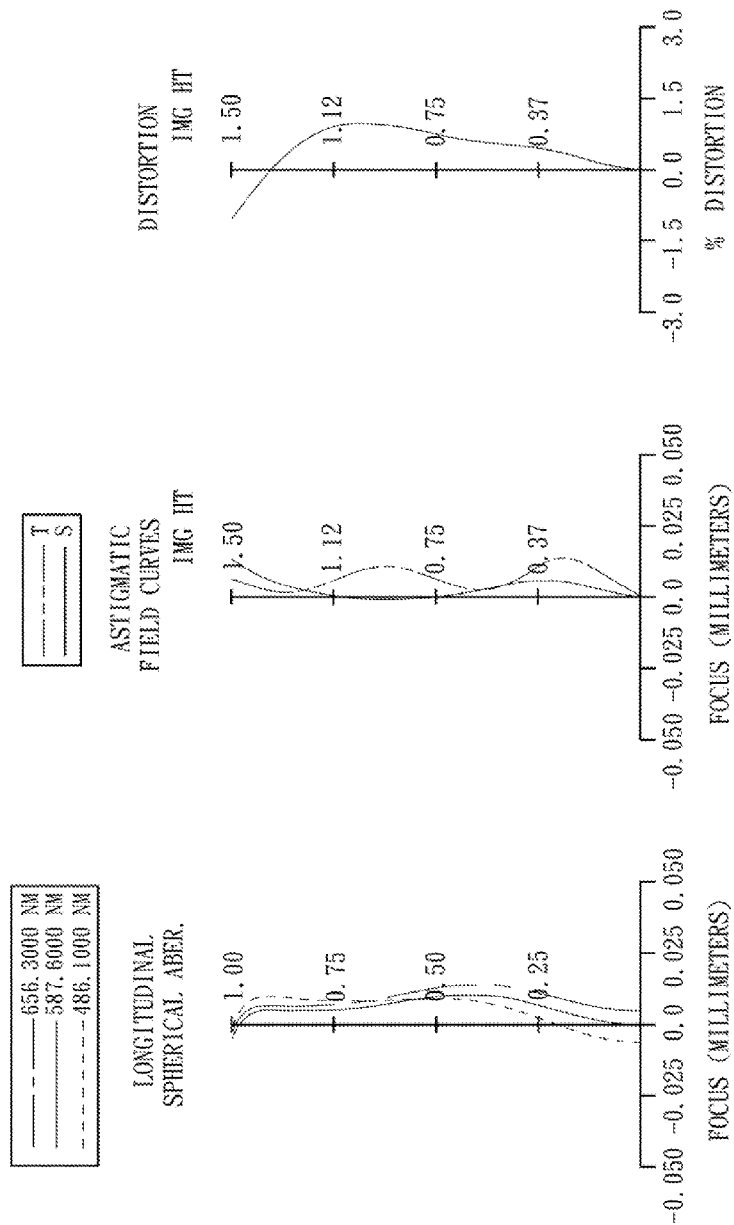
FIG. 6 shows spherical aberration curves, astigmatic field curves and a distortion curve of the optical image capturing system according to the 3rd embodiment.

FIG. 5 is a schematic view of an optical image capturing system according to the 3rd embodiment of the present disclosure. FIG. 6 shows spherical aberration curves, astigmatic field curves and a distortion curve of the optical image capturing system according to the 3rd embodiment. In FIG. 5, the optical image capturing system includes, in order from an object side to an image side, an aperture stop 300, a first lens element 310, a second lens element 320, a third lens element 330, a fourth lens element 340, a fifth lens element 350, an IR-cut filter 370 and an image plane 360.

The first lens element 310 with positive refractive power has a convex object-side surface 311 and a concave image-side surface 312. The first lens element 310 is made of plastic material and has the object-side surface 311 and the image-side surface 312 being aspheric.

The second lens element 320 with negative refractive power has a convex object-side surface 321 and a concave image-side surface 322. The second lens element 320 is made of plastic material and has the object-side surface 321 and the image-side surface 322 being aspheric. Furthermore, the object-side surface 321 of the second lens element 320 changes from convex at a paraxial region to concave at a peripheral region, and the image-side surface 322 of the second lens element 320 changes from concave at a paraxial region to convex at a peripheral region.

The third lens element 330 with positive refractive power has a convex object-side surface 331 and a convex image-side surface 332. The third lens element 330 is made of plastic material and has the object-side surface 331 and the image-side surface 332 being aspheric.

The fourth lens element 340 with negative refractive power has a concave object-side surface 341 and a convex image-side surface 342. The fourth lens element 340 is made of plastic material and has the object-side surface 341 and the image-side surface 342 being aspheric.

The fifth lens element 350 with positive refractive power has a convex object-side surface 351 and a concave image-side surface 352. The fifth lens element 350 is made of plastic material and has the object-side surface 351 and the image-side surface 352 being aspheric. Furthermore, the fifth lens element 350 has at least one inflection point on the image-side surface 352 thereof.

The IR-cut filter 370 is made of glass material, wherein the IR-cut filter 370 is located between the fifth lens element 350 and the image plane 360, and will not affect the focal length of the optical image capturing system.

The detailed optical data of the 3rd embodiment are shown in Table 5 and the aspheric surface data are shown in Table 6 below.

TABLE 5

3rd Embodiment
f = 2.27 mm, Fno = 1.90, HFOV = 33.5 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.119 | | | | |
| 2 | Lens 1 | 1.312 | (ASP) | 0.347 | Plastic | 1.544 | 55.9 | 6.01 |
| 3 | | 1.987 | (ASP) | 0.149 | | | | |
| 4 | Lens 2 | 1.344 | (ASP) | 0.220 | Plastic | 1.650 | 21.4 | −9.65 |
| 5 | | 1.036 | (ASP) | 0.113 | | | | |
| 6 | Lens 3 | 2.406 | (ASP) | 0.558 | Plastic | 1.544 | 55.9 | 1.67 |
| 7 | | −1.341 | (ASP) | 0.256 | | | | |
| 8 | Lens 4 | −0.422 | (ASP) | 0.250 | Plastic | 1.650 | 21.4 | −2.79 |
| 9 | | −0.679 | (ASP) | 0.035 | | | | |
| 10 | Lens 5 | 0.897 | (ASP) | 0.622 | Plastic | 1.535 | 56.3 | 5.49 |
| 11 | | 0.979 | (ASP) | 0.400 | | | | |
| 12 | IR-cut filter | Plano | | 0.200 | Glass | 1.517 | 64.2 | — |
| 13 | | Plano | | 0.245 | | | | |
| 14 | Image | Plano | | — | | | | |

Reference wavelength (d-line) is 587.6 nm.

TABLE 6

Aspheric Coefficients

| Surface # | 2 | 3 | 4 | 5 | 6 |
|---|---|---|---|---|---|
| k = | −5.9685E−01 | −2.6575E+01 | −1.0065E+01 | −5.2251E+00 | −3.0000E+01 |
| A4 = | −3.5020E−02 | −1.2829E−01 | −6.6255E−01 | −6.5151E−01 | −1.3572E−01 |
| A6 = | 3.2699E−01 | −2.2267E−01 | −2.0085E−01 | 3.1007E−01 | −4.6840E−01 |
| A8 = | −1.8024E+00 | −2.8161E−01 | 1.1688E+00 | −6.3567E−01 | −2.7580E−01 |
| A10 = | 4.2452E+00 | −1.0349E+00 | −6.0381E+00 | −5.3805E−01 | 7.5199E−01 |
| A12 = | −5.1130E+00 | 3.3679E−01 | 5.4587E+00 | 1.0391E+00 | −1.6673E+00 |
| A14 = | 8.5519E−02 | −1.2268E−01 | 7.8495E−02 | −5.2648E−02 | 2.7147E+00 |
| A16 = | | | | | −1.8180E+00 |

| Surface # | 7 | 8 | 9 | 10 | 11 |
|---|---|---|---|---|---|
| k = | 5.1869E−03 | −2.6042E+00 | −7.7889E−01 | −7.8716E+00 | −5.2251E+00 |
| A4 = | −1.8615E−01 | −3.6192E−01 | 5.0633E−01 | −2.3041E−01 | −1.1015E−01 |
| A6 = | −5.9111E−03 | −5.6489E−01 | −5.7362E−01 | 2.6385E−02 | 1.9859E−02 |
| A8 = | −7.2257E−01 | 1.3368E+00 | 2.9015E−01 | −6.7356E−02 | −1.6450E−02 |
| A10 = | 4.6829E−01 | −1.5508E+00 | 3.2078E−01 | 2.7910E−02 | 1.1938E−02 |
| A12 = | 2.4506E+00 | 1.0714E+00 | −2.0292E−01 | 1.6369E−02 | −5.4095E−03 |
| A14 = | −2.6152E+00 | 2.2683E+00 | −2.7269E−01 | 2.1168E−02 | 1.1409E−03 |
| A16 = | | −2.7472E+00 | 3.4281E−01 | −1.3620E−02 | |

In the optical image capturing system according to the 3rd embodiment, the definitions of f, Fno, HFOV, V2, V3, V4, R6, R7, CT3, f1, f2, f3, f4, EPD and Td are the same as those stated in the 1st embodiment with corresponding values for the 3rd embodiment. Moreover, these parameters can be calculated from Table 3 and Table 4 as the following values and satisfy the following relationships:

| f (mm) | 2.27 | R7/f | −0.19 |
|---|---|---|---|
| Fno | 1.90 | \|f/f2\| | 0.236 |
| HFOV (deg.) | 33.5 | f/f4 | −0.814 |
| V4/V3 | 0.38 | \|f3/f1\| + \|f4/f2\| | 0.567 |
| (V2 + V4)/V3 | 0.77 | f/EPD | 1.90 |
| R6/CT3 | −2.40 | Td (mm) | 2.55 |

4th Embodiment

Figure 7:
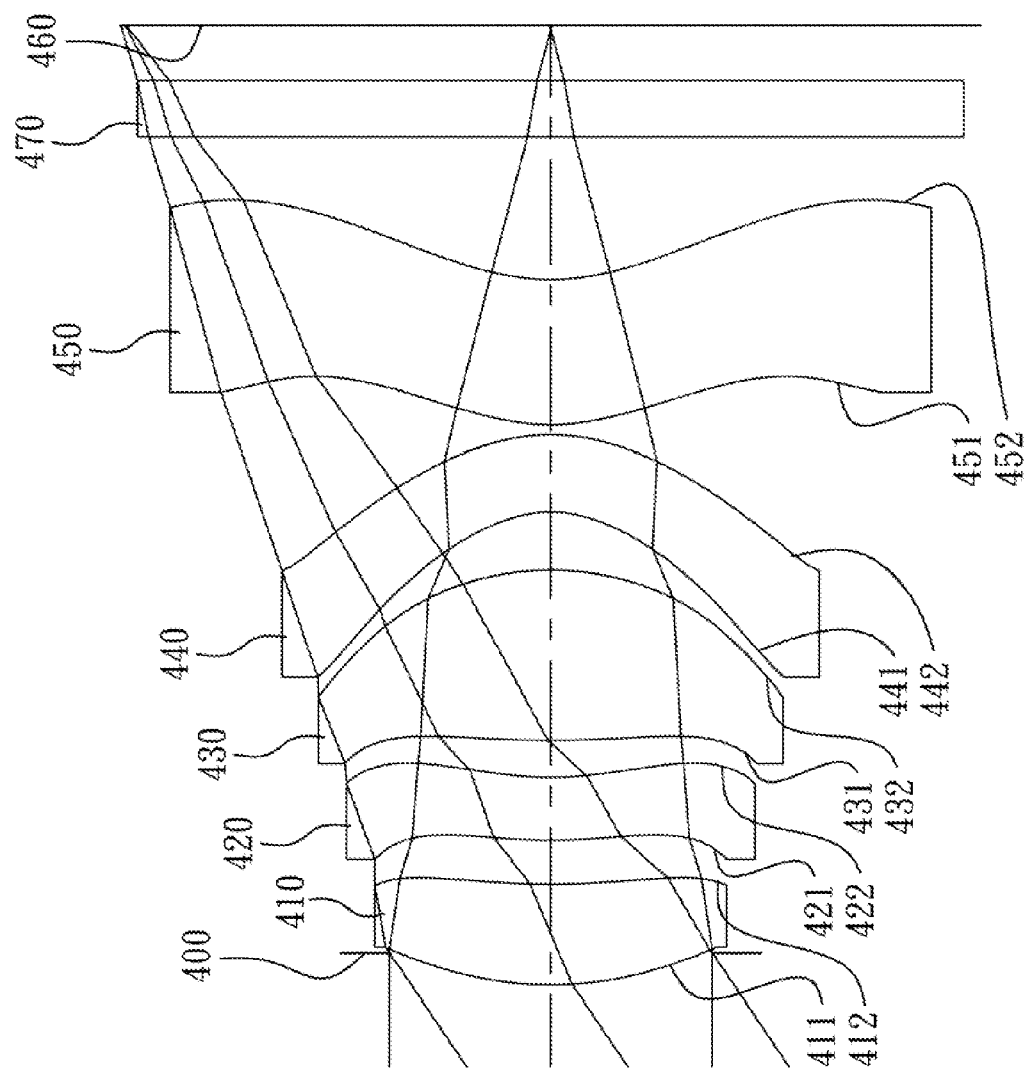
FIG. 7 is a schematic view of an optical image capturing system according to the 4th embodiment of the present disclosure.
Figure 8:
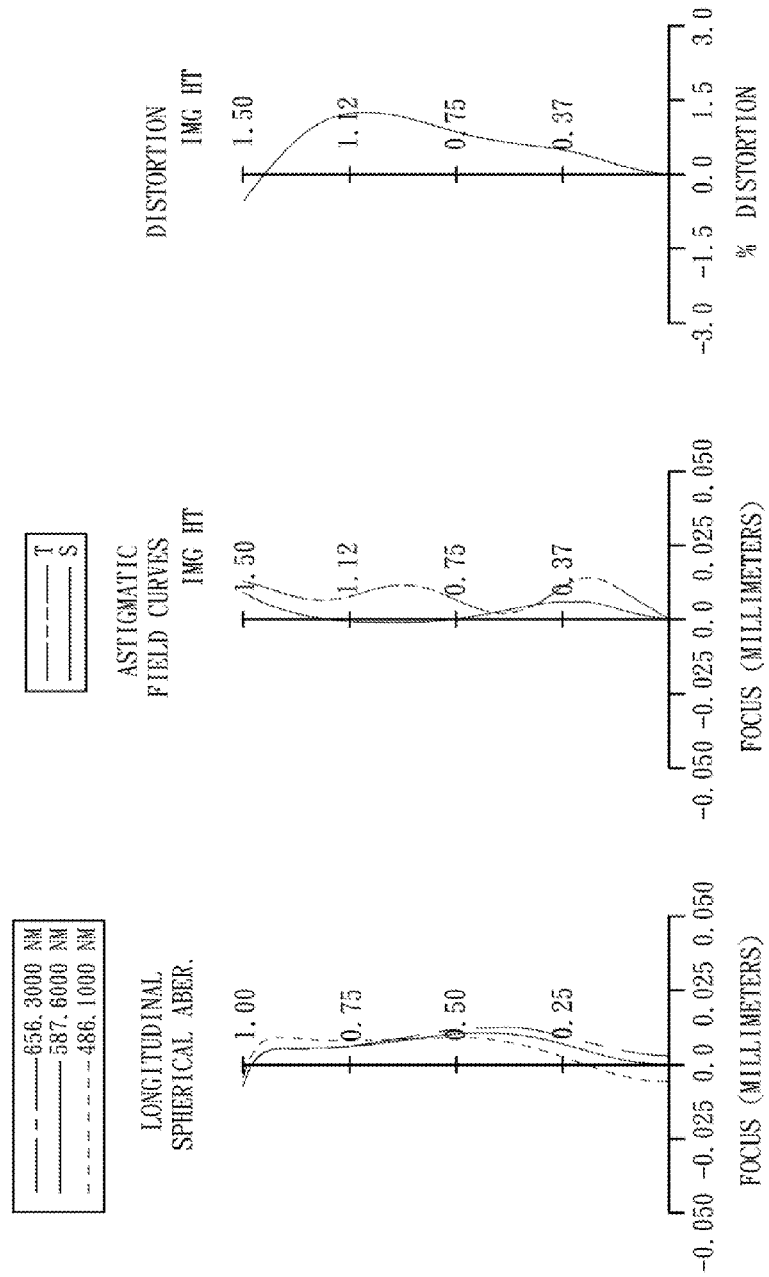
FIG. 8 shows spherical aberration curves, astigmatic field curves and a distortion curve of the optical image capturing system according to the 4th embodiment.

FIG. 7 is a schematic view of an optical image capturing system according to the 4th embodiment of the present disclosure. FIG. 8 shows spherical aberration curves, astigmatic field curves and a distortion curve of the optical image capturing system according to the 4th embodiment. In FIG. 7, the optical image capturing system includes, in order from an object side to an image side, an aperture stop 400, a first lens element 410, a second lens element 420, a third lens element 430, a fourth lens element 440, a fifth lens element 450, an IR-cut filter 470 and an image plane 460.

The first lens element 410 with positive refractive power has a convex object-side surface 411 and a concave image-side surface 412. The first lens element 410 is made of plastic material and has the object-side surface 411 and the image-side surface 412 being aspheric.

The second lens element 420 with negative refractive power has a convex object-side surface 421 and a concave image-side surface 422. The second lens element 420 is made of plastic material and has the object-side surface 421 and the image-side surface 422 being aspheric. Furthermore, the object-side surface 421 of the second lens element 420 changes from convex at a paraxial region to concave at a peripheral region, and the image-side surface 422 of the second lens element 420 changes from concave at a paraxial region to convex at a peripheral region.

The third lens element 430 with positive refractive power has a convex object-side surface 431 and a convex image-side surface 432. The third lens element 430 is made of plastic material and has the object-side surface 431 and the image-side surface 432 being aspheric.

The fourth lens element 440 with negative refractive power has a concave object-side surface 441 and a convex image-side surface 442. The fourth lens element 440 is made of plastic material and has the object-side surface 441 and the image-side surface 442 being aspheric.

The fifth lens element 450 with positive refractive power has a convex object-side surface 451 and a concave image-side surface 452. The fifth lens element 450 is made of plastic material and has the object-side surface 451 and the image-side surface 452 being aspheric. Furthermore, the fifth lens element 450 has at least one inflection point on the image-side surface 452 thereof.

The IR-cut filter 470 is made of glass material, wherein the IR-cut filter 470 is located between the fifth lens element 450 and the image plane 460, and will not affect the focal length of the optical image capturing system.

The detailed optical data of the 4th embodiment are shown in Table 7 and the aspheric surface data are shown in Table 8 below.

TABLE 7

4th Embodiment
f = 2.21 mm, Fno = 1.95, HFOV = 34.1 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.113 | | | | |
| 2 | Lens 1 | 1.290 | (ASP) | 0.356 | Plastic | 1.544 | 55.9 | 4.32 |
| 3 | | 2.584 | (ASP) | 0.154 | | | | |
| 4 | Lens 2 | 1.722 | (ASP) | 0.220 | Plastic | 1.634 | 23.8 | −6.73 |
| 5 | | 1.166 | (ASP) | 0.132 | | | | |
| 6 | Lens 3 | 3.656 | (ASP) | 0.598 | Plastic | 1.535 | 56.3 | 1.58 |
| 7 | | −1.036 | (ASP) | 0.206 | | | | |
| 8 | Lens 4 | −0.407 | (ASP) | 0.270 | Plastic | 1.634 | 23.8 | −2.44 |
| 9 | | −0.693 | (ASP) | 0.035 | | | | |
| 10 | Lens 5 | 0.745 | (ASP) | 0.513 | Plastic | 1.535 | 56.3 | 4.83 |
| 11 | | 0.796 | (ASP) | 0.500 | | | | |
| 12 | IR-cut filter | Plano | | 0.200 | Glass | 1.517 | 64.2 | — |
| 13 | | Plano | | 0.195 | | | | |
| 14 | Image | Plano | | — | | | | |

Reference wavelength (d-line) is 587.6 nm.

TABLE 8

Aspheric Coefficients

| Surface # | 2 | 3 | 4 | 5 | 6 |
|---|---|---|---|---|---|
| k = | −3.0645E−01 | −2.0000E+01 | −1.7657E+01 | −5.1910E+00 | −2.0000E+01 |
| A4 = | −1.2561E−02 | −3.0269E−01 | −7.4674E−01 | −6.8533E−01 | −2.3341E−01 |
| A6 = | 2.4928E−01 | 2.1521E−01 | −4.5372E−01 | 3.0237E−01 | −1.7316E−01 |
| A8 = | −1.5790E+00 | −9.0960E−01 | 1.5955E+00 | −2.8187E−01 | −7.8185E−01 |

TABLE 8-continued

Aspheric Coefficients

| | | | | | |
|---|---|---|---|---|---|
| A10 = | 4.8284E+00 | −6.6363E−01 | −5.4412E+00 | −6.9424E−01 | 6.5702E−01 |
| A12 = | −7.6256E+00 | −2.6575E+00 | −6.7779E−01 | −8.1493E−01 | −1.5067E−01 |
| A14 = | 8.5519E−02 | −1.2268E−01 | 7.8495E−02 | 1.0044E+00 | −8.3604E−01 |
| A16 = | | | | | −1.8180E+00 |

| Surface # | 7 | 8 | 9 | 10 | 11 |
|---|---|---|---|---|---|
| k = | −1.8057E−01 | −2.5677E+00 | −7.8395E−01 | −5.2505E+00 | −3.6532E+00 |
| A4 = | −1.5455E−01 | −3.8584E−01 | 5.1663E−01 | −1.7624E−01 | −1.2531E−01 |
| A6 = | 3.4656E−02 | −4.6773E−01 | −5.6673E−01 | −2.4500E−02 | 1.6715E−02 |
| A8 = | −6.2934E−01 | 1.2895E+00 | 2.7873E−01 | −3.2528E−02 | −8.5192E−03 |
| A10 = | 3.1030E−01 | −1.6454E+00 | 2.5734E−01 | 4.3795E−02 | 1.1790E−02 |
| A12 = | 2.0419E+00 | 9.8523E−01 | −2.0212E−01 | 6.0963E−04 | −7.9585E−03 |
| A14 = | −1.7907E+00 | 2.2819E+00 | −2.0218E−01 | 4.1954E−03 | 1.9876E−03 |
| A16 = | | −2.2256E+00 | 2.7309E−01 | −3.9270E−03 | |

In the optical image capturing system according to the 4th embodiment, the definitions of f, Fno, HFOV, V2, V3, V4, R6, R7, CT3, f1, f2, f3, f4, EPD and Td are the same as those stated in the 1st embodiment with corresponding values for the 4th embodiment. Moreover, these parameters can be calculated from Table 7 and Table 8 as the following values and satisfy the following relationships:

| | | | |
|---|---|---|---|
| f (mm) | 2.21 | R7/f | −0.18 |
| Fno | 1.95 | \|f/f2\| | 0.329 |
| HFOV (deg.) | 34.1 | f/f4 | −0.905 |
| V4/V3 | 0.42 | \|f3/f1\| + \|f4/f2\| | 0.729 |
| (V2 + V4)/V3 | 0.85 | f/EPD | 1.95 |
| R6/CT3 | −1.73 | Td (mm) | 2.48 |

5th Embodiment

Figure 9:
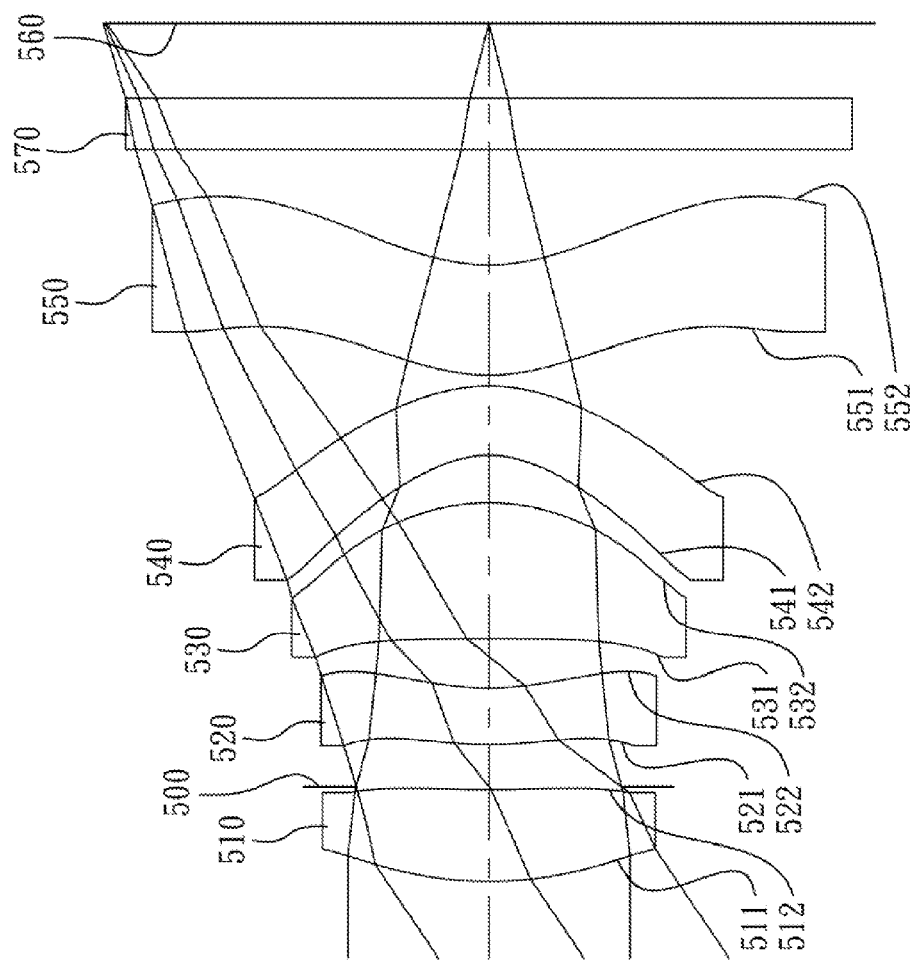
FIG. 9 is a schematic view of an optical image capturing system according to the 5th embodiment of the present disclosure.
Figure 10:
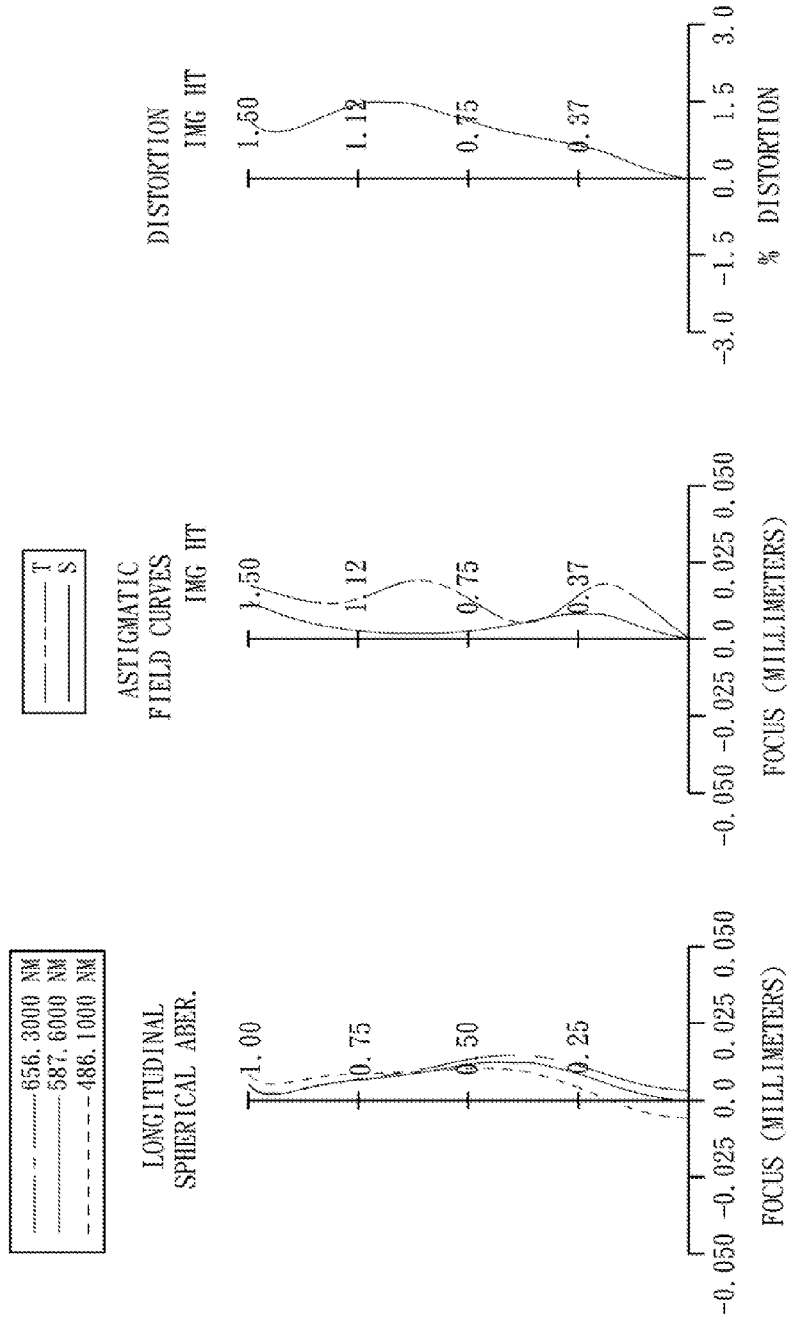
FIG. 10 shows spherical aberration curves, astigmatic field curves and a distortion curve of the optical image capturing system according to the 5th embodiment.

FIG. 9 is a schematic view of an optical image capturing system according to the 5th embodiment of the present disclosure. FIG. 10 shows spherical aberration curves, astigmatic field curves and a distortion curve of the optical image capturing system according to the 5th embodiment. In FIG. 9, the optical image capturing system includes, in order from an object side to an image side, a first lens element 510, an aperture stop 500, a second lens element 520, a third lens element 530, a fourth lens element 540, a fifth lens element 550, an IR-cut filter 570 and an image plane 560.

The first lens element 510 with positive refractive power has a convex object-side surface 511 and a concave image-side surface 512. The first lens element 510 is made of plastic material and has the object-side surface 511 and the image-side surface 512 being aspheric.

The second lens element 520 with negative refractive power has a convex object-side surface 521 and a concave image-side surface 522. The second lens element 520 is made of plastic material and has the object-side surface 521 and the image-side surface 522 being aspheric. Furthermore, the object-side surface 521 of the second lens element 520 changes from convex at a paraxial region to concave at a peripheral region, and the image-side surface 522 of the second lens element 520 changes from concave at a paraxial region to convex at a peripheral region.

The third lens element 530 with positive refractive power has a concave object-side surface 531 and a convex image-side surface 532. The third lens element 530 is made of plastic material and has the object-side surface 531 and the image-side surface 532 being aspheric.

The fourth lens element 540 with negative refractive power has a concave object-side surface 541 and a convex image-side surface 542. The fourth lens element 540 is made of plastic material and has the object-side surface 541 and the image-side surface 542 being aspheric.

The fifth lens element 550 with positive refractive power has a convex object-side surface 551 and a concave image-side surface 552. The fifth lens element 550 is made of plastic material and has the object-side surface 551 and the image-side surface 552 being aspheric. Furthermore, the fifth lens element 550 has at least one inflection point on the image-side surface 552 thereof.

The IR-cut filter 570 is made of glass material, wherein the IR-cut filter 570 is located between the fifth lens element 550 and the image plane 560, and will not affect the focal length of the optical image capturing system.

The detailed optical data of the 5th embodiment are shown in Table 9 and the aspheric surface data are shown in Table 10 below.

TABLE 9

5th Embodiment
f = 2.20 mm, Fno = 2.00, HFOV = 33.9 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.458 (ASP) | 0.358 | Plastic | 1.544 | 55.9 | 3.51 |
| 2 | | 5.620 (ASP) | 0.011 | | | | |
| 3 | Ape. Stop | Plano | 0.185 | | | | |
| 4 | Lens 2 | 1.593 (ASP) | 0.220 | Plastic | 1.640 | 23.3 | −6.97 |
| 5 | | 1.110 (ASP) | 0.190 | | | | |
| 6 | Lens 3 | −43.271 (ASP) | 0.532 | Plastic | 1.544 | 55.9 | 1.56 |
| 7 | | −0.836 (ASP) | 0.185 | | | | |
| 8 | Lens 4 | −0.409 (ASP) | 0.270 | Plastic | 1.640 | 23.3 | −2.43 |

TABLE 9-continued

5th Embodiment
f = 2.20 mm, Fno = 2.00, HFOV = 33.9 deg.

| Surface # | | Curvature Radius | Thickness | Material | Index | Abbe # | Focal length |
|---|---|---|---|---|---|---|---|
| 9 | | −0.698 (ASP) | 0.042 | | | | |
| 10 | Lens 5 | 0.719 (ASP) | 0.430 | Plastic | 1.544 | 55.9 | 5.78 |
| 11 | | 0.735 (ASP) | 0.450 | | | | |
| 12 | IR-cut filter | Plano. | 0.200 | Glass | 1.517 | 64.2 | — |
| 13 | | Plano | 0.291 | | | | |
| 14 | Image | Plano | — | | | | |

Reference wavelength (d-line) is 587.6 nm.

TABLE 10

Aspheric Coefficients

| Surface # | 1 | 2 | 4 | 5 | 6 |
|---|---|---|---|---|---|
| k = | −7.2644E−01 | −1.9391E+01 | −1.6533E+01 | −4.0828E+00 | −2.0000E+01 |
| A4 = | −3.3241E−02 | −4.8673E−01 | −7.1607E−01 | −6.8472E−01 | −2.1373E−01 |
| A6 = | 2.1518E−01 | 6.0027E−01 | −3.8300E−01 | 3.2696E−01 | −1.6399E−01 |
| A8 = | −1.6054E+00 | −5.2831E−01 | 1.5618E+00 | 2.5534E−01 | −6.9907E−01 |
| A10 = | 4.0617E+00 | −4.1805E+00 | −3.1631E+00 | −6.7968E−01 | 1.7139E+00 |
| A12 = | −6.0687E+00 | 6.6674E+00 | 9.2935E−01 | −2.3008E+00 | 2.8112E+00 |
| A14 = | 8.5519E−02 | −1.2268E−01 | 7.8495E−02 | 1.0604E+00 | −7.9038E+00 |
| A16 = | | | | | −1.8180E+00 |

| Surface # | 7 | 8 | 9 | 10 | 11 |
|---|---|---|---|---|---|
| k = | −4.8472E−01 | −2.6450E+00 | −8.0441E−01 | −5.2034E+00 | −3.7466E+00 |
| A4 = | −1.3012E−02 | −3.2727E−01 | 5.3536E−01 | −1.6850E−01 | −1.4270E−01 |
| A6 = | 6.9519E−02 | −2.3715E−01 | −5.7823E−01 | −1.8525E−02 | 2.1072E−02 |
| A8 = | −5.5878E−01 | 1.2801E+00 | 2.7671E−01 | −8.6422E−03 | −1.2835E−02 |
| A10 = | 5.1599E−01 | −1.8114E+00 | 2.4119E−01 | 4.1878E−02 | 1.2592E−02 |
| A12 = | 2.2400E+00 | 6.8576E−01 | −1.8096E−01 | −8.8413E−03 | −8.1759E−03 |
| A14 = | −1.7428E+00 | 2.0299E+00 | −1.5045E−01 | −2.2380E−04 | 2.5449E−03 |
| A16 = | | −1.1290E+00 | 2.5046E−01 | −3.9248E−04 | |

In the optical image capturing system according to the 5th embodiment, the definitions of f, Fno, HFOV, V2, V3, V4, R6, R7, CT3, f1, f2, f3, f4, EPD and Td are the same as those stated in the 1st embodiment with corresponding values for the 5th embodiment. Moreover, these parameters can be calculated from Table 9 and Table 10 as the following values and satisfy the following relationships:

| f (mm) | 2.20 | R7/f | −0.19 |
|---|---|---|---|
| Fno | 2.00 | |f/f2| | 0.315 |
| HFOV (deg.) | 33.9 | f/f4 | −0.904 |
| V4/V3 | 0.42 | |f3/f1| + |f4/f2| | 0.793 |
| (V2 + V4)/V3 | 0.83 | f/EPD | 2.00 |
| R6/CT3 | −1.57 | Td (mm) | 2.40 |

6th Embodiment

Figure 11:
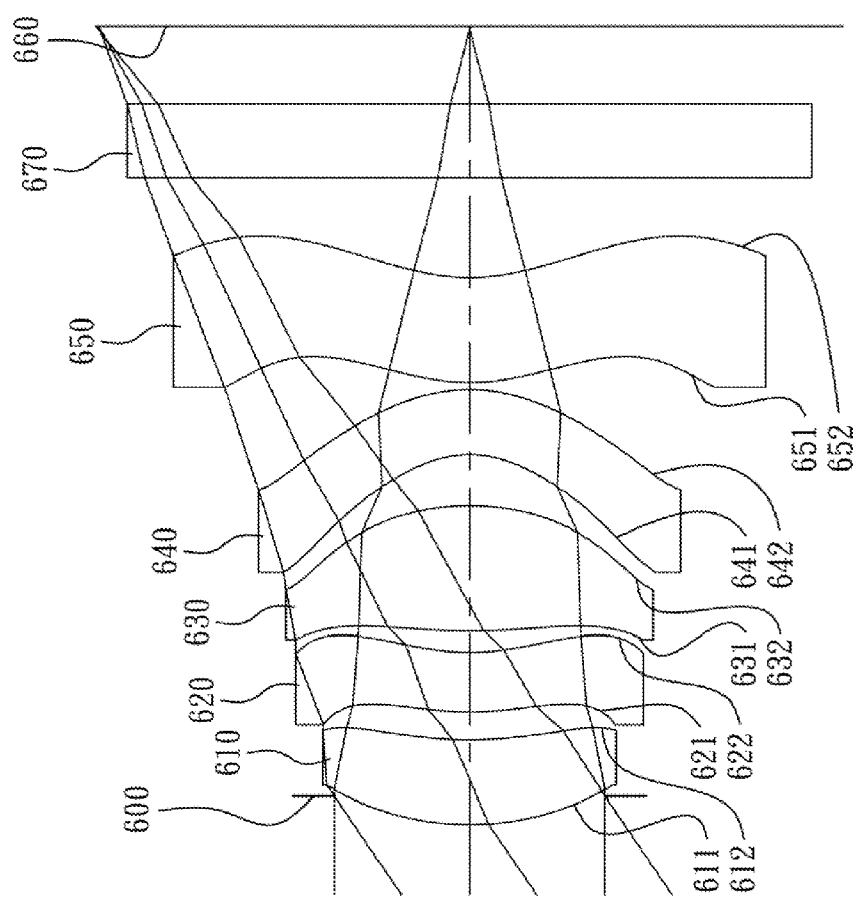
FIG. 11 is a schematic view of an optical image capturing system according to the 6th embodiment of the present disclosure.
Figure 12:
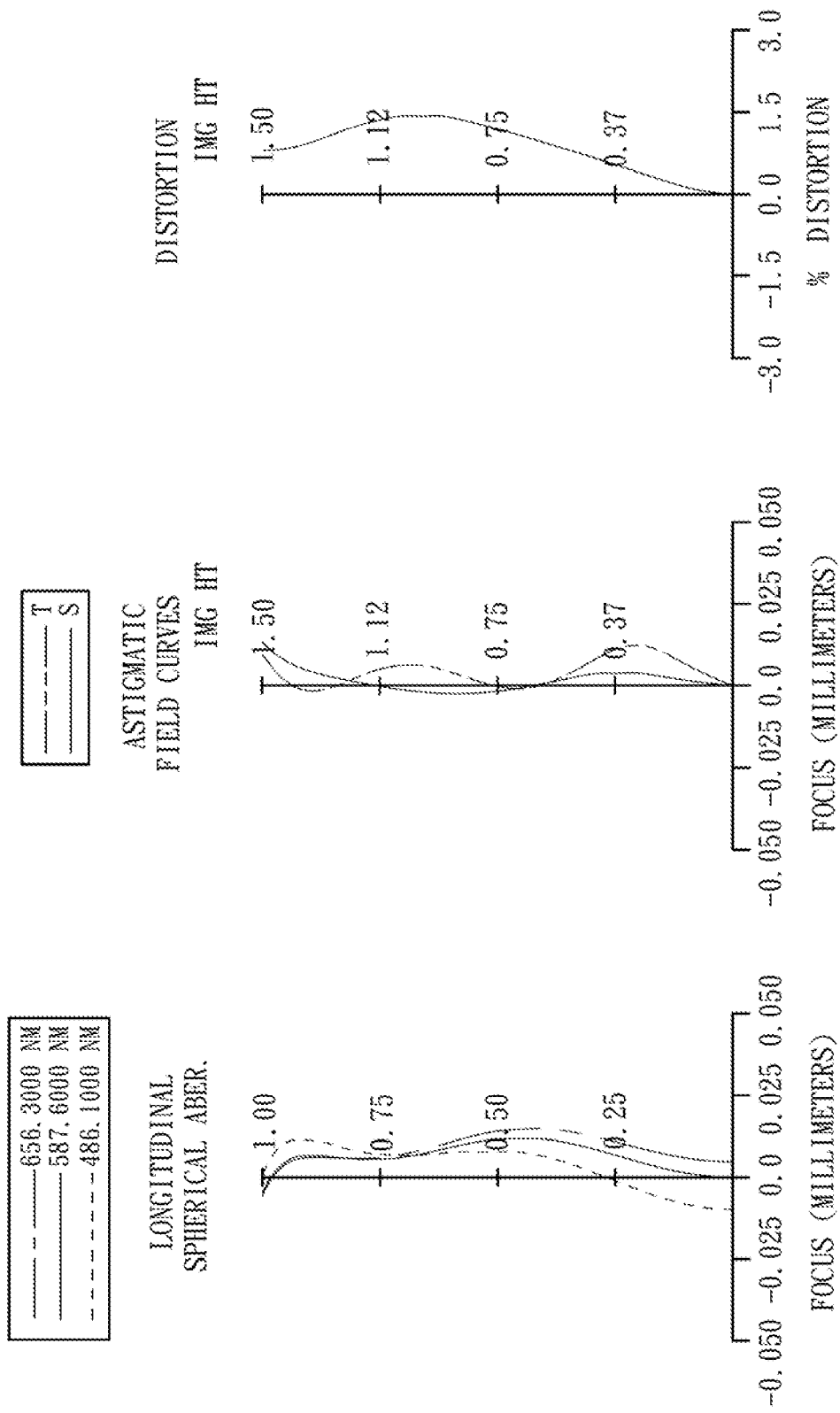
FIG. 12 shows spherical aberration curves, astigmatic field curves and a distortion curve of the optical image capturing system according to the 6th embodiment.

FIG. 11 is a schematic view of an optical image capturing system according to the 6th embodiment of the present disclosure. FIG. 12 shows spherical aberration curves, astigmatic field curves and a distortion curve of the optical image capturing system according to the 6th embodiment. In FIG. 11, the optical image capturing system includes, in order from an object side to an image side, an aperture stop 600, a first lens element 610, a second lens element 620, a third lens element 630, a fourth lens element 640, a fifth lens element 650, an IR-cut filter 670 and an image plane 660.

The first lens element 610 with positive refractive power has a convex object-side surface 611 and a concave image-side surface 612. The first lens element 610 is made of plastic material and has the object-side surface 611 and the image-side surface 612 being aspheric.

The second lens element 620 with negative refractive power has a convex object-side surface 621 and a concave image-side surface 622. The second lens element 620 is made of plastic material and has the object-side surface 621 and the image-side surface 622 being aspheric. Furthermore, the object-side surface 621 of the second lens element 620 changes from convex at a paraxial region to concave at a peripheral region, and the image-side surface 622 of the second lens element 620 changes from concave at the paraxial region to convex at the peripheral region.

The third lens element 630 with positive refractive power has a convex object-side surface 631 and a convex image-side surface 632. The third lens element 630 is made of plastic material and has the object-side surface 631 and the image-side surface 632 being aspheric.

The fourth lens element 640 with negative refractive power has a concave object-side surface 641 and a convex image-side surface 642. The fourth lens element 640 is made of plastic material and has the object-side surface 641 and the image-side surface 642 being aspheric.

The fifth lens element 650 with positive refractive power has a convex object-side surface 651 and a concave image-side surface 652. The fifth lens element 650 is made of plastic material and has the object-side surface 651 and the image-side surface 652 being aspheric. Furthermore, the fifth lens element 650 has at least one inflection point on the image-side surface 652 thereof.

The IR-cut filter 670 is made of glass material, wherein the IR-cut filter 670 is located between the fifth lens element 650 and the image plane 660, and will not affect the focal length of the optical image capturing system.

The detailed optical data of the 6th embodiment are shown in Table 11 and the aspheric surface data are shown in Table 12 below.

| f (mm) | 2.18 | R7/f | −0.19 |
|---|---|---|---|
| Fno | 2.00 | \|f/f2\| | 0.252 |
| HFOV (deg.) | 34.1 | f/f4 | −0.748 |
| V4/V3 | 0.42 | \|f3/f1\| + \|f4/f2\| | 0.555 |
| (V2 + V4)/V3 | 0.83 | f/EPD | 2.00 |
| R6/CT3 | −2.06 | Td (mm) | 2.21 |

TABLE 11

6th Embodiment
f = 2.18 mm, Fno = 2.00, HFOV = 34.1 deg.

| Surface # | | Curvature Radius | | Thickness | Material | Index | Abbe # | Focal length |
|---|---|---|---|---|---|---|---|---|
| 0 | Object | Plano. | | Infinity. | | | | |
| 1 | Ape. Stop. | Plano. | | −0.115 | | | | |
| 2 | Lens 1 | 1.153 | (ASP) | 0.343 | Plastic. | 1.544 | 55.9 | 6.50 |
| 3 | | 1.530 | (ASP) | 0.112 | | | | |
| 4 | Lens 2 | 1.230 | (ASP) | 0.240 | Plastic. | 1.640 | 23.3 | −8.67 |
| 5 | | 0.930 | (ASP) | 0.086 | | | | |
| 6 | Lens 3 | 2.502 | (ASP) | 0.504 | Plastic. | 1.544 | 55.9 | 1.42 |
| 7 | | −1.040 | (ASP) | 0.209 | | | | |
| 8 | Lens 4 | −0.413 | (ASP) | 0.260 | Plastic. | 1.640 | 23.3 | −2.92 |
| 9 | | −0.661 | (ASP) | 0.030 | | | | |
| 10 | Lens 5 | 0.805 | (ASP) | 0.424 | Plastic. | 1.544 | 55.9 | 7.21 |
| 11 | | 0.824 | (ASP) | 0.400 | | | | |
| 12 | IR-cut filter | Plano. | | 0.300 | Glass. | 1.517 | 64.2 | — |
| 13 | | Plano. | | 0.313 | | | | |
| 14 | Image | Plano. | | — | | | | |

Reference wavelength (d-line) is 587.6 nm.

TABLE 12

Aspheric Coefficients

| Surface # | 2 | 3 | 4 | 5 | 6 |
|---|---|---|---|---|---|
| k = | −2.7629E−01 | −2.1193E+01 | −1.1033E+01 | −6.1615E+00 | −4.7823E+01 |
| A4 = | −1.8487E−02 | −5.9821E−02 | −8.3409E−01 | −5.7008E−01 | −1.8792E−01 |
| A6 = | 6.0871E−01 | −4.1617E−02 | −7.3148E−02 | 3.2348E−01 | −4.9206E−01 |
| A8 = | −1.7908E+00 | −1.1172E−01 | 7.6351E−01 | −9.8946E−01 | −1.2942E+00 |
| A10 = | 2.8228E+00 | −5.3760E+00 | −1.1746E+01 | −9.8273E−01 | 8.1424E−01 |
| A12 = | −1.0790E+00 | 2.0782E−02 | −6.1699E−02 | 1.0733E−01 | −1.6835E+00 |
| A14 = | 8.5519E−02 | −1.2268E−01 | 7.8495E−02 | 1.9968E−02 | 2.9510E+00 |
| A16 = | | | | | −1.8180E+00 |

| Surface # | 7 | 8 | 9 | 10 | 11 |
|---|---|---|---|---|---|
| k = | 1.8411E−01 | −2.4026E+00 | −8.1812E+00 | −5.3788E+00 | −4.0940E+00 |
| A4 = | −3.4259E−01 | −3.4798E−01 | 5.4983E−01 | −4.1076E−01 | −2.7862E−01 |
| A6 = | 3.4807E−01 | −7.2212E−01 | −6.0587E−01 | 4.9745E−02 | 8.5839E−02 |
| A8 = | −9.5780E−01 | 1.7794E+00 | 1.7865E−01 | −1.2546E−01 | −2.3592E−02 |
| A10 = | 4.1931E−01 | −8.8235E−01 | 4.0996E−01 | 1.2222E−02 | 6.3579E−03 |
| A12 = | 3.6862E+00 | 1.0873E+00 | 2.3807E−03 | 9.0206E−02 | −1.4080E−03 |
| A14 = | −8.4384E−02 | 1.7505E+00 | −1.9298E−01 | 1.2600E−01 | 1.1286E−03 |
| A16 = | | −2.6874E+00 | 3.1713E−01 | −9.5631E−02 | |

In the optical image capturing system according to the 6th embodiment, the definitions of f, Fno, HFOV, V2, V3, V4, R6, R7, CT3, f1, f2, f3, f4, EPD and Td are the same as those stated in the 1st embodiment with corresponding values for the 6th embodiment. Moreover, these parameters can be calculated from Table 11 and Table 12 as the following values and satisfy the following relationships:

7th Embodiment

Figure 13:
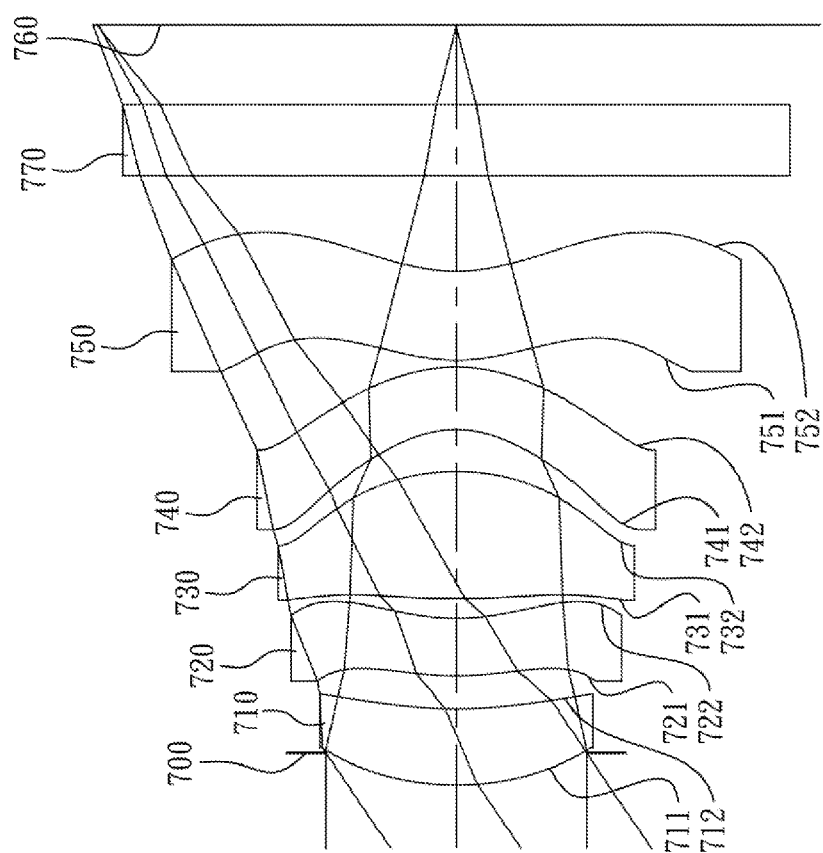
FIG. 13 is a schematic view of an optical image capturing system according to the 7th embodiment of the present disclosure.
Figure 14:
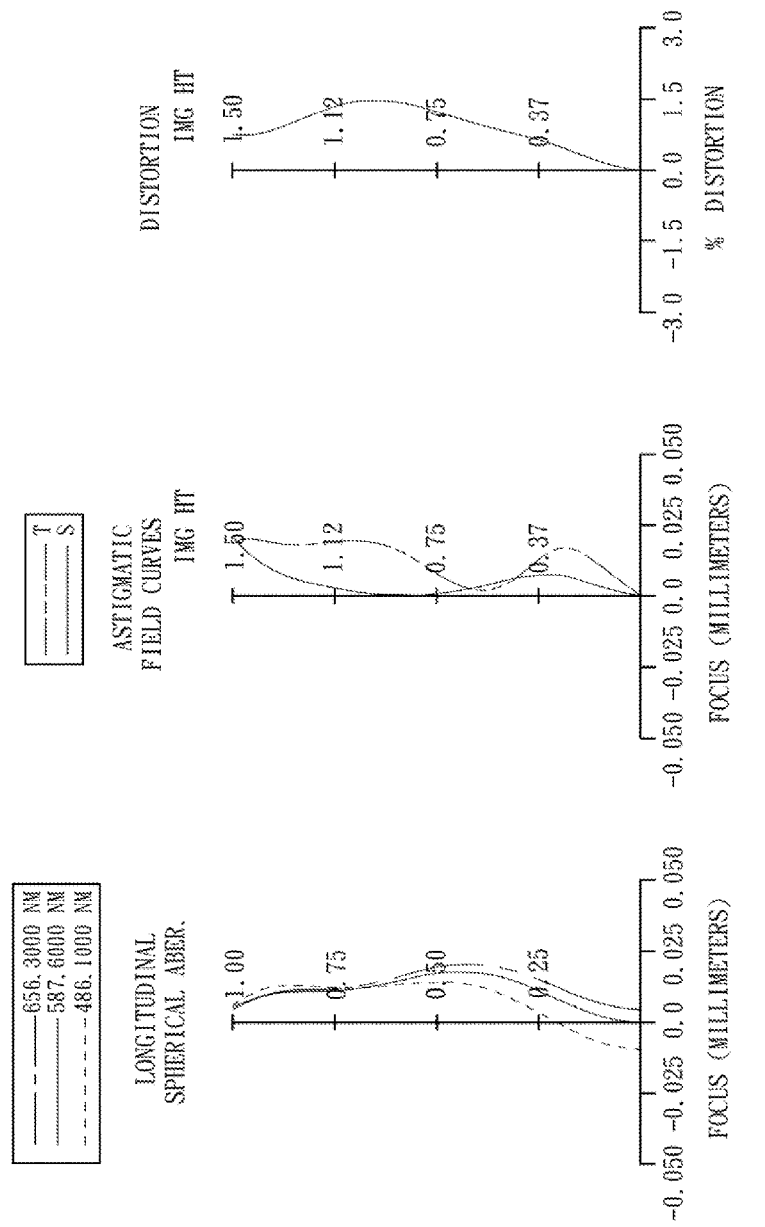
FIG. 14 shows spherical aberration curves, astigmatic field curves and a distortion curve of the optical image capturing system according to the 7th embodiment.

FIG. 13 is a schematic view of an optical image capturing system according to the 7th embodiment of the present disclosure. FIG. 14 shows spherical aberration curves, astigmatic field curves and a distortion curve of the optical image capturing system according to the 7th embodiment. In FIG.

13, the optical image capturing system includes, in order from an object side to an image side, an aperture stop 700, a first lens element 710, a second lens element 720, a third lens element 730, a fourth lens element 740, a fifth lens element 750, an IR-cut filter 770 and an image plane 760.

The first lens element 710 with positive refractive power has a convex object-side surface 711 and a concave image-side surface 712. The first lens element 710 is made of plastic material and has the object-side surface 711 and the image-side surface 712 being aspheric.

The second lens element 720 with negative refractive power has a convex object-side surface 721 and a concave image-side surface 722. The second lens element 720 is made of plastic material and has the object-side surface 721 and the image-side surface 722 being aspheric. Furthermore, the object-side surface 721 of the second lens element 720 changes from convex at a paraxial region to concave at a peripheral region, and the image-side surface 722 of the second lens element 720 changes from concave at a paraxial region to convex at a peripheral region.

The third lens element 730 with positive refractive power has a convex object-side surface 731 and a convex image-side surface 732. The third lens element 730 is made of plastic material and has the object-side surface 731 and the image-side surface 732 being aspheric.

The fourth lens element 740 with negative refractive power has a concave object-side surface 741 and a convex image-side surface 742. The fourth lens element 740 is made of plastic material and has the object-side surface 741 and the image-side surface 742 being aspheric.

The fifth lens element 750 with positive refractive power has a convex object-side surface 751 and a concave image-side surface 752. The fifth lens element 750 is made of plastic material and has the object-side surface 751 and the image-side surface 752 being aspheric. Furthermore, the fifth lens element 750 has at least one inflection point on the image-side surface 752 thereof.

The IR-cut filter 770 is made of glass material, wherein the IR-cut filter 770 is located between the fifth lens element 750 and the image plane 760, and will not affect the focal length of the optical image capturing system.

The detailed optical data of the 7th embodiment are shown in Table 13 and the aspheric surface data are shown in Table 14 below.

TABLE 13

7th Embodiment
f = 2.18 mm, Fno = 2.00, HFOV = 34.2 deg.

| Surface # | | Curvature Radius | | Thickness | Material | Index | Abbe # | Focal length |
|---|---|---|---|---|---|---|---|---|
| 0 | Object. | Plano. | | Infinity. | | | | |
| 1 | Ape. Stop. | Plano. | | −0.134 | | | | |
| 2 | Lens 1 | 1.145 | (ASP) | 0.319 | Plastic | 1.544 | 55.9 | 5.22 |
| 3 | | 1.729 | (ASP) | 0.139 | | | | |
| 4 | Lens 2 | 1.223 | (ASP) | 0.240 | Plastic | 1.640 | 23.3 | −7.56 |
| 5 | | 0.901 | (ASP) | 0.081 | | | | |
| 6 | Lens 3 | 3.285 | (ASP) | 0.531 | Plastic | 1.544 | 55.9 | 1.40 |
| 7 | | −0.939 | (ASP) | 0.178 | | | | |
| 8 | Lens 4 | −0.437 | (ASP) | 0.260 | Plastic | 1.640 | 23.3 | −3.27 |
| 9 | | −0.680 | (ASP) | 0.030 | | | | |
| 10 | Lens 5 | 0.765 | (ASP) | 0.370 | Plastic | 1.544 | 55.9 | 15.98 |
| 11 | | 0.696 | (ASP) | 0.400 | | | | |
| 12 | IR-cut filter | Plano. | | 0.300 | Glass | 1.517 | 64.2 | — |
| 13 | | Plano. | | 0.331 | | | | |
| 14 | Image | Plano. | | — | | | | |

Reference wavelength (d-line) is 587.6 nm.

TABLE 14

Aspheric Coefficients

| Surface # | 2 | 3 | 4 | 5 | 6 |
|---|---|---|---|---|---|
| k = | −2.3906E−01 | −2.4164E+01 | −1.1222E+01 | −4.1454E+00 | −4.1354E+01 |
| A4 = | −1.4737E−02 | −8.6717E−02 | −8.2336E−01 | −7.8574E−01 | −2.0061E−01 |
| A6 = | 6.7195E−01 | 3.0259E−01 | −3.6871E−01 | 3.9256E−01 | −4.4667E−01 |
| A8 = | −1.7177E+00 | 9.3193E−01 | 1.5142E+00 | −3.3514E−01 | 5.9627E−02 |
| A10 = | 3.2739E+00 | −5.8860E+00 | −5.3035E+00 | −1.3146E+00 | 1.3565E+00 |
| A12 = | −6.0469E−01 | 7.0353E+00 | −6.5276E+00 | −2.5214E+00 | 1.2123E+00 |
| A14 = | 8.5519E−02 | −1.2268E−01 | 7.8495E−02 | 5.5828E+00 | −1.7665E+00 |
| A16 = | | | | | −1.8204E+00 |

| Surface # | 7 | 8 | 9 | 10 | 11 |
|---|---|---|---|---|---|
| k = | −1.5168E−02 | −2.8153E+00 | −8.2458E−01 | −6.0177E+00 | −4.4272E+00 |
| A4 = | −2.3709E−01 | −4.4107E−01 | 5.9236E−01 | −5.1143E−01 | −3.3904E−01 |
| A6 = | 3.9371E−01 | −5.5618E−01 | −8.1462E−01 | 9.9703E−02 | 1.4687E−01 |
| A8 = | −8.2754E−01 | 1.8404E+00 | 3.0593E−01 | −1.2523E−01 | −5.7906E−02 |
| A10 = | 9.7923E−01 | −9.3954E−01 | 6.8584E−01 | 1.6407E−01 | 8.6452E−03 |
| A12 = | 4.0437E+00 | 1.7649E+00 | 1.3902E−01 | 1.1515E−01 | 3.1662E−03 |
| A14 = | −1.7106E+00 | 2.5464E+00 | −1.9794E−01 | 1.7369E−01 | 8.3679E−05 |
| A16 = | | −4.5681E+00 | 1.6963E−01 | −1.4259E−01 | |

In the optical image capturing system according to the 7th embodiment, the definitions of f, Fno, HFOV, V2, V3, V4, R6, R7, CT3, f1, f2, f3, f4, EPD and Td are the same as those stated in the 1st embodiment with corresponding values for the 7th embodiment. Moreover, these parameters can be calculated from Table 13 and Table 14 as the following values and satisfy the following relationships:

| | | | |
|---|---|---|---|
| f (mm) | 2.18 | R7/f | −0.20 |
| Fno | 2.00 | \|f/f2\| | 0.288 |
| HFOV (deg.) | 34.2 | f/f4 | −0.667 |
| V4/V3 | 0.42 | \|f3/f1\| + \|f4/f2\| | 0.701 |
| (V2 + V4)/V3 | 0.83 | f/EPD | 2.00 |
| R6/CT3 | −1.77 | Td (mm) | 2.15 |

8th Embodiment

Figure 15:
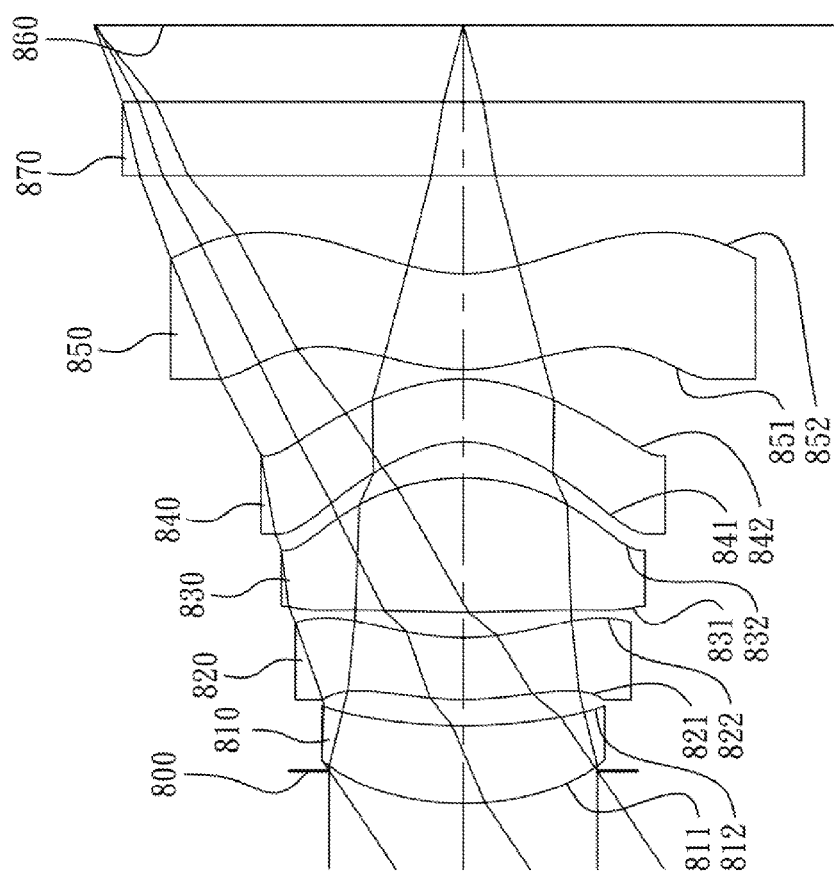
FIG. 15 is a schematic view of an optical image capturing system according to the 8th embodiment of the present disclosure.
Figure 16:
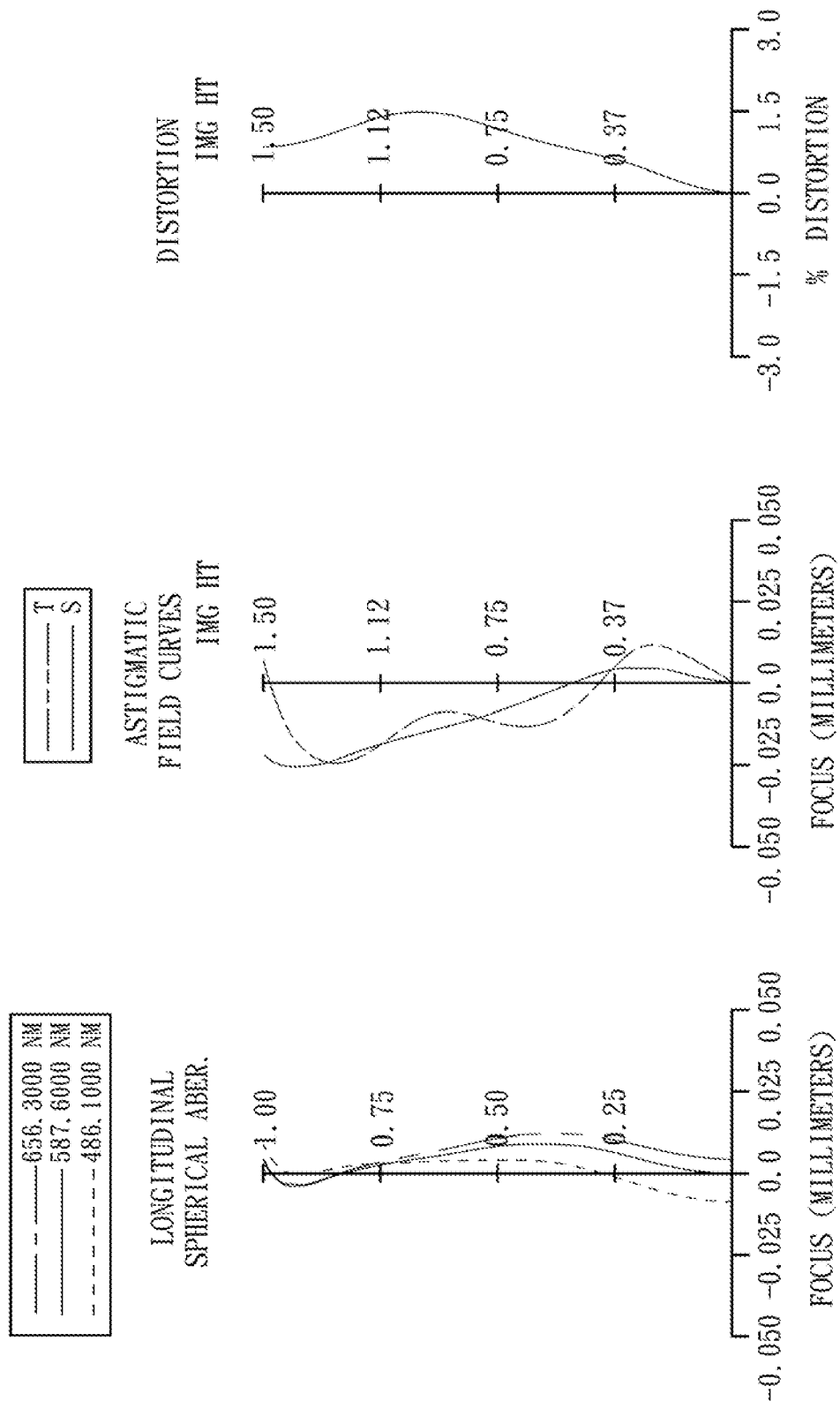
FIG. 16 shows spherical aberration curves, astigmatic field curves and a distortion curve of the optical image capturing system according to the 8th embodiment.

FIG. 15 is a schematic view of an optical image capturing system according to the 8th embodiment of the present disclosure. FIG. 16 shows spherical aberration curves, astigmatic field curves and a distortion curve of the optical image capturing system according to the 8th embodiment. In FIG. 15, the optical image capturing system includes, in order from an object side to an image side, an aperture stop 800, a first lens element 810, a second lens element 820, a third lens element 830, a fourth lens element 840, a fifth lens element 850, an IR-cut filter 870 and an image plane 860.

The first lens element 810 with positive refractive power has a convex object-side surface 811 and a concave image-side surface 812. The first lens element 810 is made of plastic material and has the object-side surface 811 and the image-side surface 812 being aspheric.

The second lens element 820 with negative refractive power has a convex object-side surface 821 and a concave image-side surface 822. The second lens element 820 is made of plastic material and has the object-side surface 821 and the image-side surface 822 being aspheric. Furthermore, the object-side surface 821 of the second lens element 820 changes from convex at a paraxial region to concave at a peripheral region, and the image-side surface 822 of the second lens element 820 changes from concave at a paraxial region to convex at a peripheral region.

The third lens element 830 with positive refractive power has a convex object-side surface 831 and a convex image-side surface 832. The third lens element 830 is made of plastic material and has the object-side surface 831 and the image-side surface 832 being aspheric.

The fourth lens element 840 with negative refractive power has a concave object-side surface 841 and a convex image-side surface 842. The fourth lens element 840 is made of plastic material and has the object-side surface 841 and the image-side surface 842 being aspheric.

The fifth lens element 850 with positive refractive power has a convex object-side surface 851 and a concave image-side surface 852. The fifth lens element 850 is made of plastic material and has the object-side surface 851 and the image-side surface 852 being aspheric. Furthermore, the fifth lens element 850 has at least one inflection point on the image-side surface 852 thereof.

The IR-cut filter 870 is made of glass material, wherein the IR-cut filter 870 is located between the fifth lens element 850 and the image plane 860, and will not affect the focal length of the optical image capturing system.

The detailed optical data of the 8th embodiment are shown in Table 15 and the aspheric surface data are shown in Table 16 below.

TABLE 15

8th Embodiment
f = 2.18 mm, Fno = 2.00, HFOV = 34.2 deg.

| Surface # | | Curvature Radius | | Thickness | Material | Index | Abbe # | Focal length |
|---|---|---|---|---|---|---|---|---|
| 0 | Object. | Plano. | | Infinity. | | | | |
| 1 | Ape. Stop. | Plano. | | −0.135 | | | | |
| 2 | Lens 1 | 1.166 | (ASP) | 0.319 | Plastic | 1.544 | 55.9 | 4.22 |
| 3 | | 2.138 | (ASP) | 0.107 | | | | |
| 4 | Lens 2 | 1.410 | (ASP) | 0.250 | Plastic | 1.640 | 23.3 | −8.49 |
| 5 | | 1.042 | (ASP) | 0.106 | | | | |
| 6 | Lens 3 | 5.895 | (ASP) | 0.546 | Plastic | 1.544 | 55.9 | 1.51 |
| 7 | | −0.926 | (ASP) | 0.145 | | | | |
| 8 | Lens 4 | −0.449 | (ASP) | 0.258 | Plastic | 1.640 | 23.3 | −3.03 |
| 9 | | −0.716 | (ASP) | 0.039 | | | | |
| 10 | Lens 5 | 0.758 | (ASP) | 0.391 | Plastic | 1.544 | 55.9 | 13.87 |
| 11 | | 0.689 | (ASP) | 0.400 | | | | |
| 12 | IR-cut filter | Plano. | | 0.300 | Plastic | 1.517 | 64.2 | — |
| 13 | | Plano. | | 0.312 | | | | |
| 14 | Image | Plano. | | — | | | | |

Reference wavelength (d-line) is 587.6 nm.

TABLE 16

Aspheric Coefficients

| Surface # | 2 | 3 | 4 | 5 | 6 |
|---|---|---|---|---|---|
| k = | 1.8226E−01 | −1.2076E+01 | −2.4136E+00 | −5.7263E−01 | −9.0000E+01 |
| A4 = | 5.2366E−02 | −3.8825E−02 | −7.5528E−01 | −6.7994E−01 | −1.3385E−01 |
| A6 = | 6.1547E−01 | 4.4494E−01 | −3.8723E−01 | −1.2978E−01 | −2.6307E−01 |
| A8 = | −1.7310E+00 | 1.0845E+00 | 7.8937E−01 | −1.8663E−01 | 1.2221E−01 |

TABLE 16-continued

| Aspheric Coefficients | | | | |
|---|---|---|---|---|
| A10 = 4.5386E+00 | −7.4040E+00 | −5.4101E+00 | −6.4036E−01 | 1.3918E+00 |
| A12 = −6.6406E−01 | 1.5600E+01 | −4.4170E+00 | −2.0221E+00 | 1.3533E+00 |
| A14 = 8.5519E−02 | −1.2268E−01 | 7.8495E−02 | 6.6651E+00 | −1.4471E+00 |
| A16 = | | | | −1.8204E+00 |

| Surface # | 7 | 8 | 9 | 10 | 11 |
|---|---|---|---|---|---|
| k = | −2.3874E−02 | −3.0979E+00 | −8.3885E−01 | −6.1017E+00 | −3.9264E+00 |
| A4 = | −2.6891E−01 | −4.0005E−01 | 6.1436E−01 | −5.2628E−01 | −4.8030E−01 |
| A6 = | 4.0284E−01 | −4.9489E−01 | −8.4494E−01 | −1.3178E−01 | 5.5763E−01 |
| A8 = | −7.0105E−01 | 1.8828E+00 | 2.6435E−01 | 1.4252E+00 | −6.8977E−01 |
| A10 = | 1.2913E+00 | −9.8707E−01 | 6.3619E−01 | −4.3286E+00 | 5.5291E−01 |
| A12 = | 4.3995E+00 | 1.7700E+00 | 1.2516E−01 | 6.1910E+00 | −2.4050E−01 |
| A14 = | −2.2293E+00 | 2.5207E+00 | −1.2383E−01 | −3.8685E+00 | 4.4288E−02 |
| A16 = | | −4.8207E+00 | 4.6892E−01 | 8.7806E−01 | |

In the optical image capturing system according to the 8th embodiment, the definitions of f, Fno, HFOV, V2, V3, V4, R6, R7, CT3, f1, f2, f3, f4, EPD and Td are the same as those stated in the 1st embodiment with corresponding values for the 8th embodiment. Moreover, these parameters can be calculated from Table 15 and Table 16 as the following values and satisfy the following relationships:

| f (mm) | 2.18 | R7/f | −0.21 |
|---|---|---|---|
| Fno | 2.00 | |f/f2| | 0.257 |
| HFOV (deg.) | 34.2 | f/f4 | −0.720 |
| V4/V3 | 0.42 | |f3/f1| + |f4/f2| | 0.715 |
| (V2 + V4)/V3 | 0.83 | f/EPD | 2.00 |
| R6/CT3 | −1.70 | Td (mm) | 2.16 |

9th Embodiment

Figure 17:
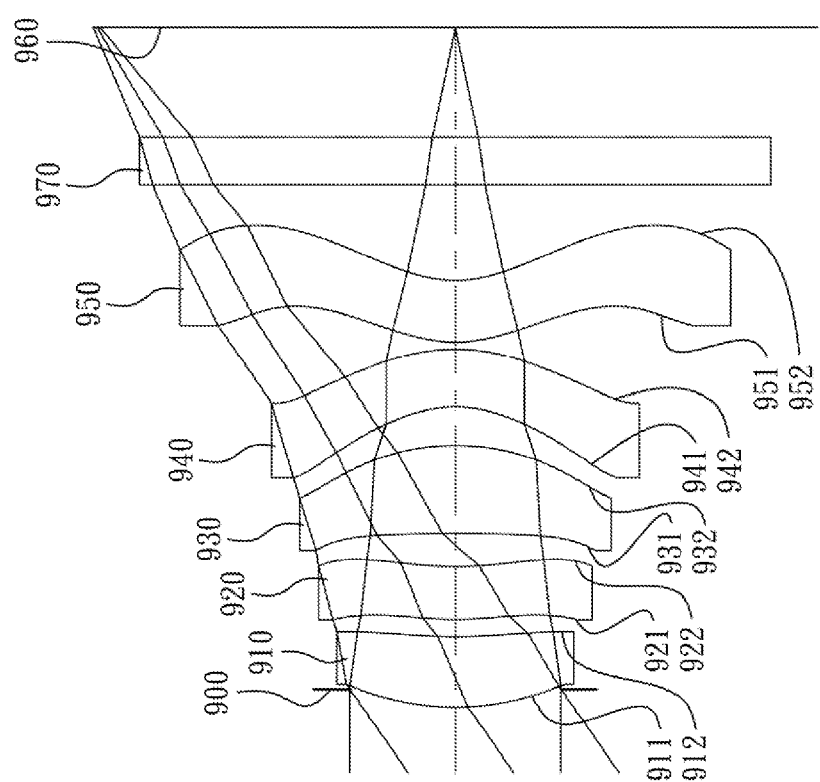
FIG. 17 is a schematic view of an optical image capturing system according to the 9th embodiment of the present disclosure.
Figure 18:
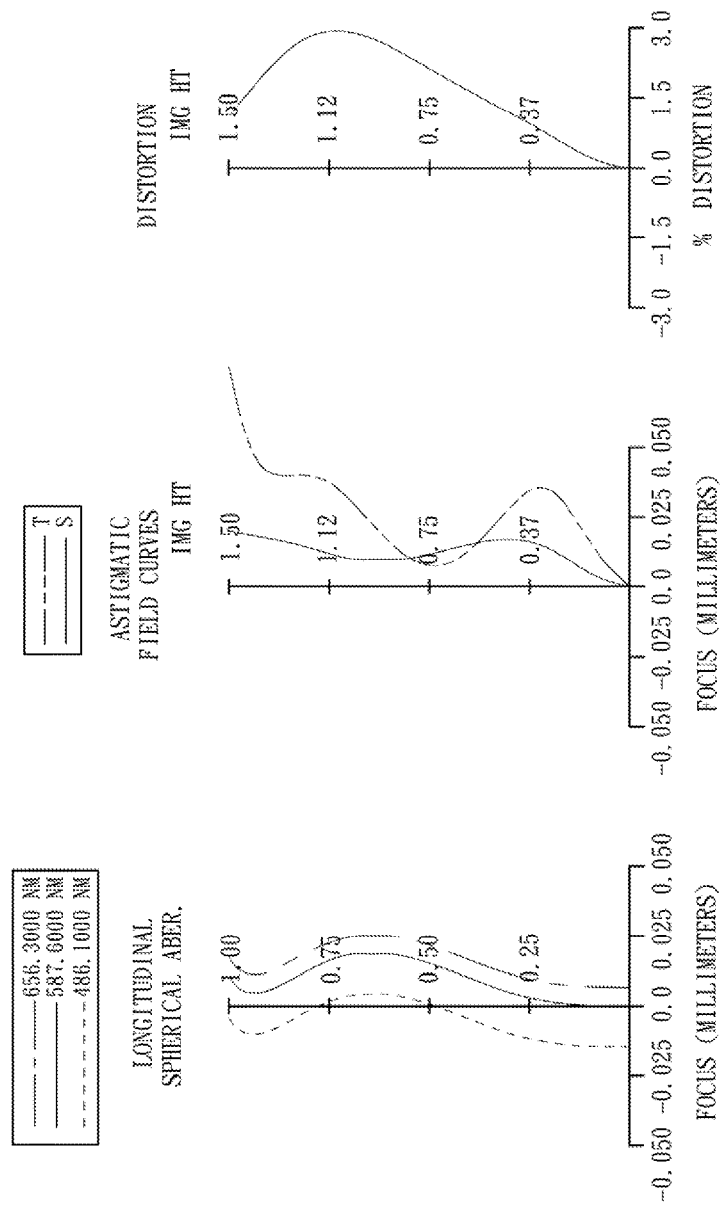
FIG. 18 shows spherical aberration curves, astigmatic field curves and a distortion curve of the optical image capturing system according to the 9th embodiment.

FIG. 17 is a schematic view of an optical image capturing system according to the 9th embodiment of the present disclosure. FIG. 18 shows spherical aberration curves, astigmatic field curves and a distortion curve of the optical image capturing system according to the 9th embodiment. In FIG. 17, the optical image capturing system includes, in order from an object side to an image side, an aperture stop 900, a first lens element 910, a second lens element 920, a third lens element 930, a fourth lens element 940, a fifth lens element 950, an IR-cut filter 970 and an image plane 960.

The first lens element 910 with positive refractive power has a convex object-side surface 911 and a concave image-side surface 912. The first lens element 910 is made of plastic material and has the object-side surface 911 and the image-side surface 912 being aspheric.

The second lens element 920 with positive refractive power has a convex object-side surface 921 and a concave image-side surface 922. The second lens element 920 is made of plastic material and has the object-side surface 921 and the image-side surface 922 being aspheric. Furthermore, the object-side surface 921 of the second lens element 920 changes from convex at a paraxial region to concave at a peripheral region, and the image-side surface 922 of the second lens element 920 changes from concave at the paraxial region to convex at the peripheral region.

The third lens element 930 with positive refractive power has a concave object-side surface 931 and a convex image-side surface 932. The third lens element 930 is made of plastic material and has the object-side surface 931 and the image-side surface 932 being aspheric.

The fourth lens element 940 with negative refractive power has a concave object-side surface 941 and a convex image-side surface 942. The fourth lens element 940 is made of plastic material and has the object-side surface 941 and the image-side surface 942 being aspheric.

The fifth lens element 950 with positive refractive power has a convex object-side surface 951 and a concave image-side surface 952. The fifth lens element 950 is made of plastic material and has the object-side surface 951 and the image-side surface 952 being aspheric. Furthermore, the fifth lens element 950 has at least one inflection point on the image-side surface 952 thereof.

The IR-cut filter 970 is made of glass material, wherein the IR-cut filter 970 is located between the fifth lens element 950 and the image plane 960, and will not affect the focal length of the optical image capturing system.

The detailed optical data of the 9th embodiment are shown in Table 17 and the aspheric surface data are shown in Table 18 below.

TABLE 17

9th Embodiment
f = 2.12 mm, Fno = 2.40, HFOV = 34.8 deg.

| Surface # | | Curvature Radius | | Thickness | Material | Index | Abbe # | Focal length |
|---|---|---|---|---|---|---|---|---|
| 0 | Object | Plano. | | Infinity. | | | | |
| 1 | Ape. Stop | Plano. | | −0.076 | | | | |
| 2 | Lens 1 | 1.086 | (ASP) | 0.295 | Plastic | 1.530 | 55.8 | 4.48 |
| 3 | | 1.812 | (ASP) | 0.073 | | | | |
| 4 | Lens 2 | 1.353 | (ASP) | 0.220 | Plastic | 1.530 | 55.8 | 23.86 |
| 5 | | 1.429 | (ASP) | 0.139 | | | | |
| 6 | Lens 3 | −10.582 | (ASP) | 0.368 | Plastic | 1.535 | 56.3 | 2.01 |
| 7 | | −0.988 | (ASP) | 0.162 | | | | |
| 8 | Lens 4 | −0.507 | (ASP) | 0.240 | Plastic | 1.632 | 23.4 | −3.62 |

TABLE 17-continued

9th Embodiment
f = 2.12 mm, Fno = 2.40, HFOV = 34.8 deg.

| Surface # | | Curvature Radius | | Thickness | Material | Index | Abbe # | Focal length |
|---|---|---|---|---|---|---|---|---|
| 9 | | −0.771 | (ASP) | 0.030 | | | | |
| 10 | Lens 5 | 0.568 | (ASP) | 0.257 | Plastic | 1.530 | 55.8 | 20.25 |
| 11 | | 0.505 | (ASP) | 0.400 | | | | |
| 12 | IR-cut filter | Plano. | | 0.200 | Glass | 1.517 | 64.2 | — |
| 13 | | Plano. | | 0.458 | | | | |
| 14 | Image | Plano. | | — | | | | |

Reference wavelength (d-line) is 587.6 nm.

TABLE 18

Aspheric Coefficients

| Surface # | 2 | 3 | 4 | 5 | 6 |
|---|---|---|---|---|---|
| k = | −5.8867E−01 | −6.6984E+01 | −2.7659E+01 | −1.6151E+00 | 2.0000E+01 |
| A4 = | −8.0261E−02 | −3.8100E−01 | −1.0142E+00 | −9.9782E−01 | −1.2957E−01 |
| A6 = | 6.0623E−01 | 2.1668E−01 | −3.8787E−01 | 2.3224E−01 | −7.5817E−01 |
| A8 = | −1.7218E+00 | 6.7679E−01 | 3.4345E+00 | −1.2878E−01 | −4.7987E−01 |
| A10 = | 4.0804E+00 | −7.2498E+00 | −2.7249E+00 | −1.8875E+00 | −1.5941E−01 |
| A12 = | −6.8923E+00 | 1.1038E+01 | 7.5682E+00 | −2.9876E+00 | −2.9322E−01 |
| A14 = | −1.6901E+01 | 5.6134E+01 | −4.9468E+00 | 8.8042E−01 | −3.9424E+00 |
| A16 = | | | | | −2.1219E+00 |

| Surface # | 7 | 8 | 9 | 10 | 11 |
|---|---|---|---|---|---|
| k = | −1.2163E−01 | −3.5814E+00 | −8.9916E−01 | −3.9638E+00 | −3.0900E+00 |
| A4 = | −1.7851E−01 | −3.6283E−01 | 6.4676E−01 | −4.8584E−01 | −4.1382E−01 |
| A6 = | 4.5005E−01 | −4.6237E−01 | −8.0417E−01 | 1.0193E−01 | 1.9383E−01 |
| A8 = | −6.8514E−01 | 1.9507E+00 | 3.6074E−01 | −1.1711E−01 | −6.2107E−02 |
| A10 = | 1.2719E+00 | −7.7655E−01 | 7.7822E−01 | 1.8310E−02 | −6.4907E−03 |
| A12 = | 4.3919E+00 | 1.8893E+00 | 2.1894E−01 | 1.1139E−01 | −1.4557E−03 |
| A14 = | −1.2342E+00 | 2.7844E+00 | −1.3331E−01 | 1.6245E−01 | 5.6060E−03 |
| A16 = | | −4.0841E+00 | 1.8339E−01 | −1.4253E−01 | |

In the optical image capturing system according to the 9th embodiment, the definitions of f, Fno, HFOV, V2, V3, V4, R6, R7, CT3, f1, f2, f3, f4, EPD and Td are the same as those stated in the 1st embodiment with corresponding values for the 9th embodiment. Moreover, these parameters can be calculated from Table 17 and Table 18 as the following values and satisfy the following relationships:

| f (mm) | 2.12 | R7/f | −0.24 |
|---|---|---|---|
| Fno | 2.40 | |f/f2| | 0.089 |
| HFOV (deg.) | 34.8 | f/f4 | −0.585 |
| V4/V3 | 0.42 | |f3/f1| + |f4/f2| | 0.600 |
| (V2 + V4)/V3 | 1.41 | f/EPD | 2.40 |
| R6/CT3 | −2.68 | Td (mm) | 1.78 |

10th Embodiment

Figure 19:
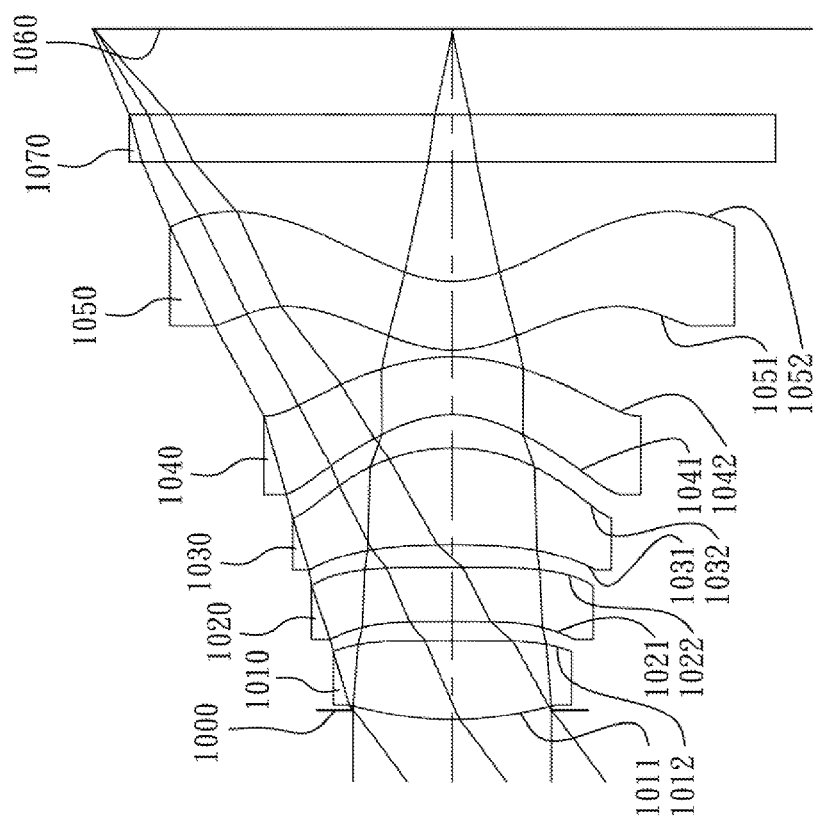
FIG. 19 is a schematic view of an optical image capturing system according to the 10th embodiment of the present disclosure.
Figure 20:
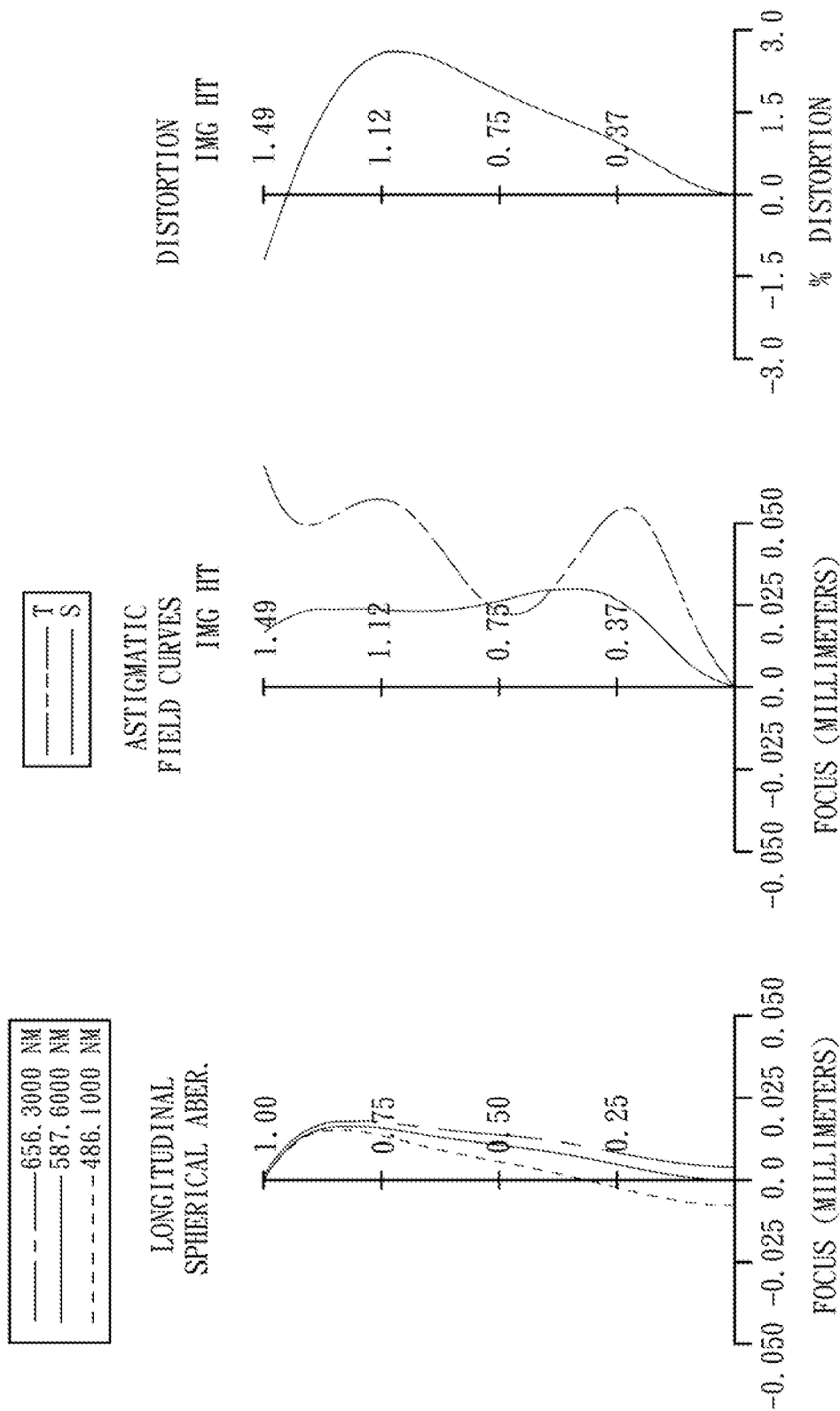
FIG. 20 shows spherical aberration curves, astigmatic field curves and a distortion curve of the optical image capturing system according to the 10th embodiment.

FIG. 19 is a schematic view of an optical image capturing system according to the 10th embodiment of the present disclosure. FIG. 20 shows spherical aberration curves, astigmatic field curves and a distortion curve of the optical image capturing system according to the 10th embodiment. In FIG. 19, the optical image capturing system includes, in order from an object side to an image side, an aperture stop 1000, a first lens element 1010, a second lens element 1020, a third lens element 1030, a fourth lens element 1040, a fifth lens element 1050, an IR-cut filter 1070 and an image plane 1060.

The first lens element 1010 with positive refractive power has a convex object-side surface 1011 and a concave image-side surface 1012. The first lens element 1010 is made of plastic material and has the object-side surface 1011 and the mage-side surface 1012 being aspheric.

The second lens element 1020 with positive refractive power has a concave object-side surface 1021 and a convex image-side surface 1022. The second lens element 1020 is made of plastic material and has the object-side surface 1021 and the image-side surface 1022 being aspheric.

The third lens element 1030 with positive refractive power has a concave object-side surface 1031 and a convex image-side surface 1032. The third lens element 1030 is made of plastic material and has the object-side surface 1031 and the image-side surface 1032 being aspheric.

The fourth lens element 1040 with negative refractive power has a concave object-side surface 1041 and a convex image-side surface 1042. The fourth lens element 1040 is made of plastic material and has the object-side surface 1041 and the image-side surface 1042 being aspheric.

The fifth lens element 1050 with positive refractive power has a convex object-side surface 1051 and a concave image-side surface 1052. The fifth lens element 1050 is made of plastic material and has the object-side surface 1051 and the image-side surface 1052 being aspheric. Furthermore, the fifth lens element 1050 has at least one inflection point on the image-side surface 1052 thereof.

The IR-cut filter 1070 is made of glass material, wherein the IR-cut filter 1070 is located between the fifth lens element 1050 and the image plane 1060, and will not affect the focal length of the optical image capturing system.

The detailed optical data of the 10th embodiment are shown in Table 19 and the aspheric surface data are shown in Table 20 below.

TABLE 19

10th Embodiment
f = 1.99 mm, Fno = 2.40, HFOV = 37.1 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.041 | | | | |
| 2 | Lens 1 | 1.357 | (ASP) | 0.329 | Plastic | 1.530 | 55.8 | 3.05 |
| 3 | | 7.712 | (ASP) | 0.082 | | | | |
| 4 | Lens 2 | −81.593 | (ASP) | 0.225 | Plastic | 1.614 | 25.6 | 444.77 |
| 5 | | −62.893 | (ASP) | 0.097 | | | | |
| 6 | Lens 3 | −2.999 | (ASP) | 0.404 | Plastic | 1.530 | 55.8 | 1.81 |
| 7 | | −0.762 | (ASP) | 0.140 | | | | |
| 8 | Lens 4 | −0.441 | (ASP) | 0.240 | Plastic | 1.632 | 23.4 | −2.14 |
| 9 | | −0.792 | (ASP) | 0.030 | | | | |
| 10 | Lens 5 | 0.495 | (ASP) | 0.285 | Plastic | 1.530 | 55.8 | 6.12 |
| 11 | | 0.468 | (ASP) | 0.500 | | | | |
| 12 | IR-cut filter | Plano. | | 0.200 | Glass | 1.517 | 64.2 | — |
| 13 | | Plano. | | 0.359 | | | | |
| 14 | Image | Plano. | | — | | | | |

Reference wavelength (d-line) is 587.6 nm.

TABLE 20

Aspheric Coefficients

| Surface # | 2 | 3 | 4 | 5 | 6 |
|---|---|---|---|---|---|
| k = | −1.6424E+00 | −7.6158E+00 | −9.0000E+01 | 2.0000E+01 | 1.5411E+01 |
| A4 = | −5.6044E−02 | −9.7675E−01 | −1.1230E+00 | −5.1936E−01 | −1.9372E−01 |
| A6 = | −2.2716E−01 | −2.3440E−02 | −5.5325E−01 | 6.8929E−02 | −2.4881E−01 |
| A8 = | −2.4735E+00 | 9.0380E−01 | 3.0109E+00 | −1.5402E−01 | 1.6647E−01 |
| A10 = | 8.6623E+00 | −7.6015E+00 | −2.8416E+00 | −1.6356E+00 | 5.0346E−01 |
| A12 = | −1.4737E+01 | 6.7914E+00 | 8.8229E+01 | −2.8329E+00 | 4.4512E−01 |
| A14 = | −1.4416E+01 | 4.3804E+01 | −8.6573E−01 | 1.1520E+00 | −2.7363E+00 |
| A16 = | | | | | −1.7344E+00 |

| Surface # | 7 | 8 | 9 | 10 | 11 |
|---|---|---|---|---|---|
| k = | −2.0319E−01 | −3.5053E+00 | −8.5542E−01 | −3.4917E+00 | −2.6038E+00 |
| A4 = | −8.6453E−02 | −3.8858E−01 | 6.4628E−01 | −4.3961E−01 | −3.9212E−01 |
| A6 = | 5.0158E−01 | −4.7131E−01 | −8.9112E−01 | 5.6183E−02 | 1.9051E−01 |
| A8 = | −6.1716E−01 | 1.9316E+00 | 2.9500E−01 | −1.4232E−01 | −5.9361E−02 |
| A10 = | 1.5028E+00 | −8.4520E−01 | 7.7253E−01 | 1.4094E−02 | −1.9450E−03 |
| A12 = | 4.7969E+00 | 1.7802E+00 | 2.2272E−01 | 1.1582E−01 | −1.7536E−03 |
| A14 = | −3.2723E−01 | 2.5411E+00 | −1.4359E−01 | 1.6694E−01 | 3.5573E−03 |
| A16 = | | −4.5935E+00 | 8.2825E−02 | −1.3766E−01 | |

In the optical image capturing system according to the 10th embodiment, the definitions of f, Fno, HFOV, V2, V3, V4, R6, R7, CT3, f1, f2, f3, f4, EPD and Td are the same as those stated in the 1st embodiment with corresponding values for the 10th embodiment. Moreover, these parameters can be calculated from Table 19 and Table 20 as the following values and satisfy the following relationships:

| f (mm) | 1.99 | R7/f | −0.22 |
|---|---|---|---|
| Fno | 2.40 | |f/f2| | 0.004 |
| HFOV (deg.) | 37.1 | f/f4 | −0.931 |
| V4/V3 | 0.42 | |f3/f1| + |f4/f2| | 0.599 |
| (V2 + V4)/V3 | 0.88 | f/EPD | 2.40 |
| R6/CT3 | −1.89 | Td (mm) | 1.83 |

11th Embodiment

Figure 21:
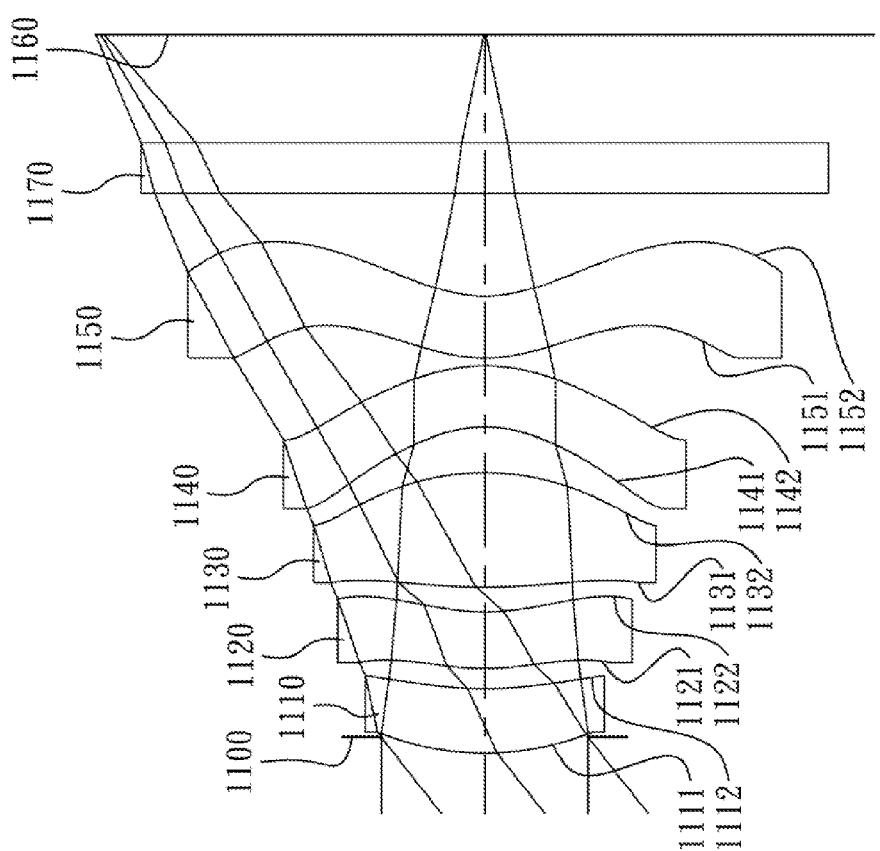
FIG. 21 is a schematic view of an optical image capturing system according to the 11th embodiment of the present disclosure.
Figure 22:
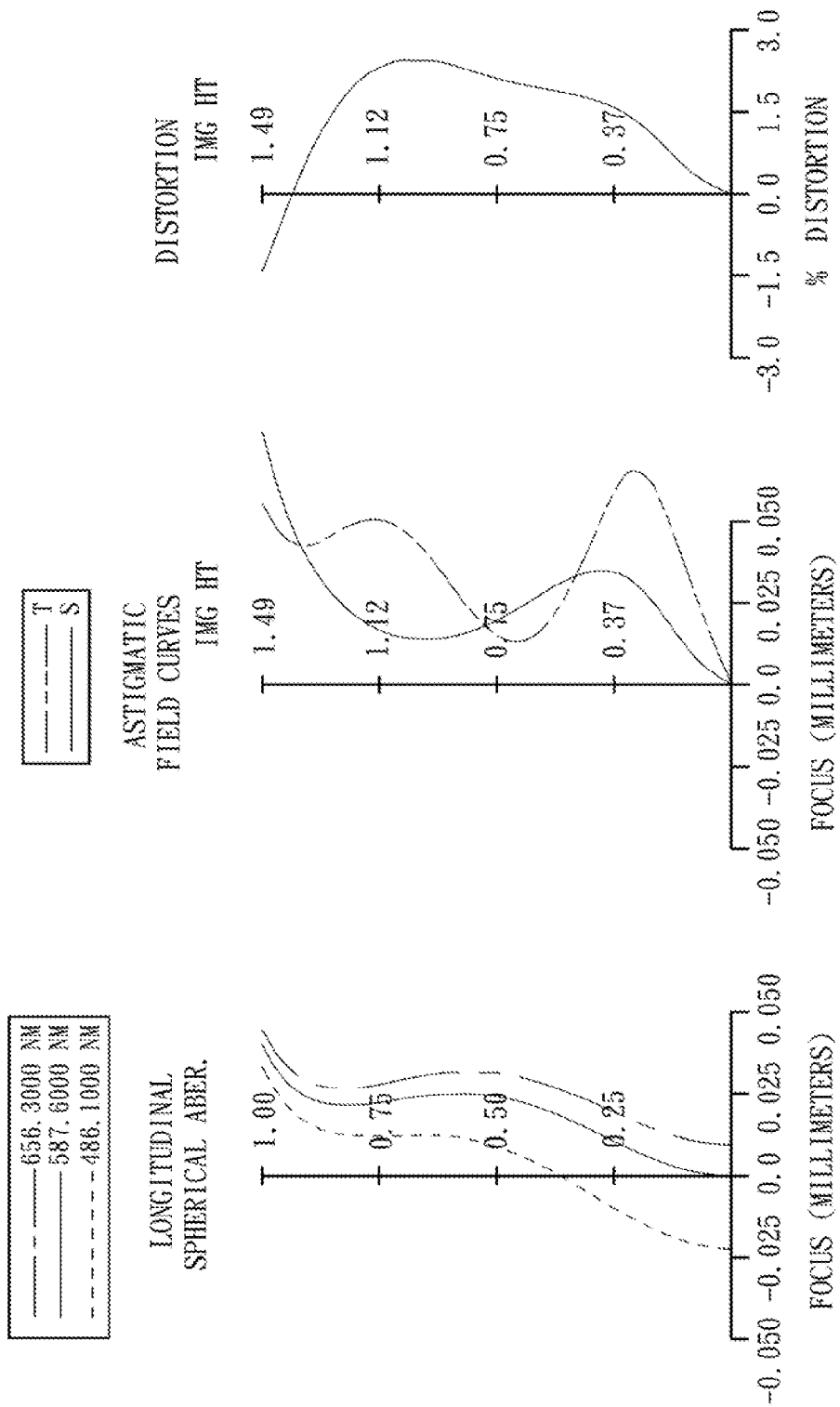
FIG. 22 shows spherical aberration curves, astigmatic field curves and a distortion curve of the optical image capturing system according to the 11th embodiment.

FIG. 21 is a schematic view of an optical image capturing system according to the 11th embodiment of the present disclosure. FIG. 22 shows spherical aberration curves, astigmatic field curves and a distortion curve of the optical image capturing system according to the 11th embodiment. In FIG. 21, the optical image capturing system includes, in order from an object side to an image side, an aperture stop 1100, a first lens element 1110, a second lens element 1120, a third lens element 1130, a fourth lens element 1140, a fifth lens element 1150, an IR-cut filter 1170 and an image plane 1160.

The first lens element 1110 with positive refractive power has a convex object-side surface 1111 and a concave image-side surface 1112. The first lens element 1110 is made of plastic material and has the object-side surface 1111 and the image-side surface 1112 being aspheric.

The second lens element 1120 with negative refractive power has a convex object-side surface 1121 and a concave image-side surface 1122. The second lens element 1120 is made of plastic material and has the object-side surface 1121 and the image-side surface 1122 being aspheric. Furthermore, the object-side surface 1121 of the second lens element 1120 changes from convex at a paraxial region to concave at a peripheral region, and the image-side surface 1122 of the second lens element 1120 changes from concave at a paraxial region to convex at a peripheral region.

The third lens element 130 with positive refractive power has a convex object-side surface 1131 and a convex image-side surface 1132. The third lens element 1130 is made of plastic material and has the object-side surface 1131 and the image-side surface 1132 being aspheric.

The fourth lens element 1140 with negative refractive power has a concave object-side surface 1141 and a convex image-side surface 1142. The fourth lens element 1140 is made of plastic material and has the object-side surface 1141 and the image-side surface 1142 being aspheric.

The fifth lens element 1150 with positive refractive power has a convex object-side surface 1151 and a concave image-side surface 1152. The fifth lens element 1150 is made of plastic material and has the object-side surface 1151 and the image-side surface 1152 being aspheric. Furthermore, the fifth lens element 1150 has at least one inflection point on the image-side surface 1152 thereof.

The IR-cut filter 1170 is made of glass material, wherein the IR-cut filter 1170 is located between the fifth lens element 1150 and the image plane 1160, and will not affect the focal length of the optical image capturing system.

The detailed optical data of the 11th embodiment are shown in Table 21 and the aspheric surface data are shown in Table 22 below.

TABLE 21

11th Embodiment.
$f = 1.93$ mm, Fno = 2.40, HFOV = 37.9 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.062 | | | | |
| 2 | Lens 1 | 1.124 | (ASP) | 0.250 | Plastic | 1.535 | 56.3 | 10.93 |
| 3 | | 1.283 | (ASP) | 0.030 | | | | |
| 4 | Lens 2 | 1.021 | (ASP) | 0.220 | Plastic | 1.650 | 21.4 | −18.75 |
| 5 | | 0.862 | (ASP) | 0.097 | | | | |
| 8 | Lens 3 | 2.414 | (ASP) | 0.445 | Plastic | 1.535 | 56.3 | 1.41 |
| 7 | | −1.030 | (ASP) | 0.177 | | | | |
| 8 | Lens 4 | −0.497 | (ASP) | 0.240 | Plastic | 1.544 | 55.9 | −5.57 |
| 9 | | −0.695 | (ASP) | 0.030 | | | | |
| 10 | Lens 5 | 0.577 | (ASP) | 0.240 | Plastic | 1.535 | 56.3 | 50.04 |
| 11 | | 0.504 | (ASP) | 0.400 | | | | |
| 12 | IR-cut filter | Plano | | 0.200 | Glass | 1.517 | 64.2 | — |
| 13 | | Plano | | 0.419 | | | | |
| 14 | Image. | Plano | | — | | | | |

Reference wavelength (d-line) is 587.6 nm.

TABLE 22

Aspheric Coefficients.

| Surface # | 2 | 3 | 4 | 5 | 6 |
|---|---|---|---|---|---|
| k = | −1.8078E−01 | −2.7769E+01 | −1.5392E+01 | −6.6111E+00 | −1.7881E+01 |
| A4 = | 3.6876E−05 | −7.2737E−02 | −9.5214E−01 | −8.1326E−01 | −2.0152E−01 |
| A6 = | 6.1550E−01 | 1.8724E−01 | −1.8737E−01 | 3.7737E−01 | −4.9774E−01 |
| A8 = | −1.7471E+00 | 4.8649E−01 | 2.2765E+00 | −3.3227E−01 | −8.2103E−02 |
| A10 = | 3.1241E+00 | −6.7690E+00 | −3.8188E+00 | −1.2728E+00 | 1.0747E+00 |
| A12 = | −1.1802E+01 | 7.6749E+00 | −6.2202E+00 | −2.4924E+00 | 8.4975E−01 |
| A14 = | −1.6901E+01 | 4.4147E+00 | −9.3967E−01 | 4.8075E+00 | −2.2304E+00 |
| A16 = | | | | | −9.8818E−01 |

| Surface # | 7 | 8 | 9 | 10 | 11 |
|---|---|---|---|---|---|
| k = | −1.9571E−01 | −3.4701E+00 | −8.6692E−01 | −5.0373E+00 | −3.7158E+00 |
| A4 = | −1.5926E−01 | −3.7922E−01 | 6.2672E−01 | −5.0340E−01 | −3.8120E−01 |
| A6 = | 4.5563E−01 | −4.8748E−01 | −8.1028E−01 | 9.0501E−02 | 1.7565E−01 |
| A8 = | −7.1643E−01 | 1.9142E+00 | 3.3868E−01 | −1.3481E−01 | −5.8441E−02 |
| A10 = | 1.1819E+00 | −8.3739E−01 | 7.3648E−01 | 1.6764E−02 | −3.8019E−03 |
| A12 = | 4.2952E+00 | 1.8553E+00 | 1.9848E−01 | 1.1661E−01 | −1.9544E−03 |
| A14 = | −1.3482E+00 | 2.7105E+00 | −1.3107E−01 | 1.7538E−01 | 3.7522E−03 |
| A16 = | | −4.2407E+00 | 2.3520E−01 | −1.4445E−01 | |

In the optical image capturing system according to the 11th embodiment, the definitions of f, Fno, HFOV, V2, V3, V4, R6, R7, CT3, f1, f2, f3, f4, EPD and Td are the same as those stated in the 1st embodiment with corresponding values for the 11th embodiment. Moreover, these parameters can be calculated from Table 21 and Table 22 as the following values and satisfy the following relationships:

| f (mm) | 1.93 | R7/f | −0.26 |
|---|---|---|---|
| Fno | 2.40 | \|f/f2\| | 0.103 |
| HFOV (deg.) | 37.9 | f/f4 | −0.347 |
| V4/V3 | 0.99 | \|f3/f1\| + \|f4/f2\| | 0.426 |
| (V2 + V4)/V3 | 1.37 | f/EPD | 2.40 |
| R6/CT3 | −2.31 | Td (mm) | 1.78 |

12th Embodiment

Figure 23:
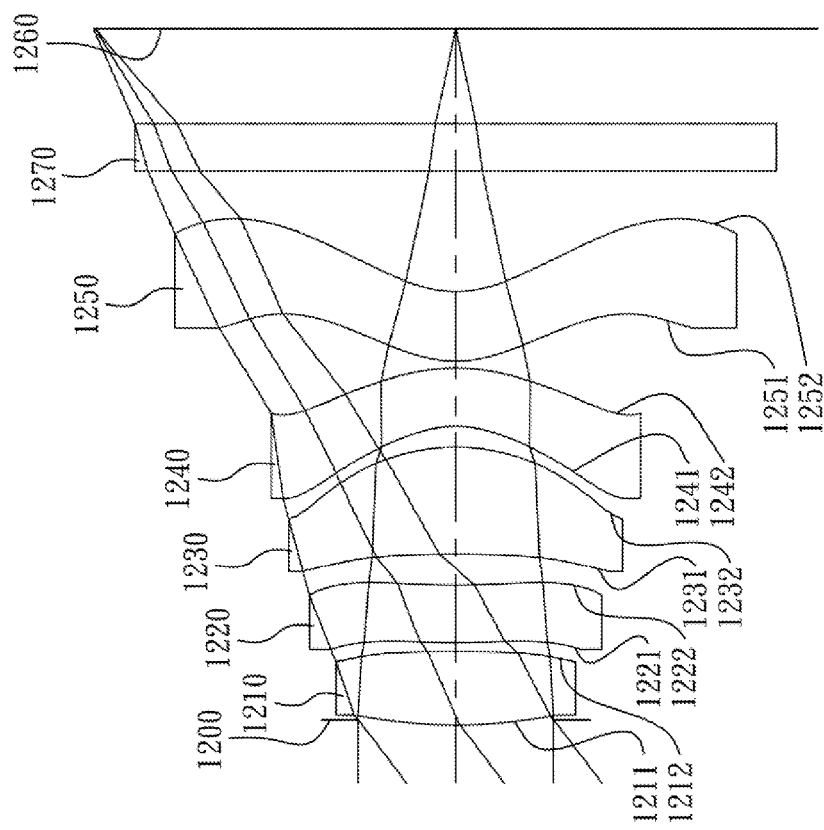
FIG. 23 is a schematic view of an optical image capturing system according to the 12th embodiment of the present disclosure.
Figure 24:
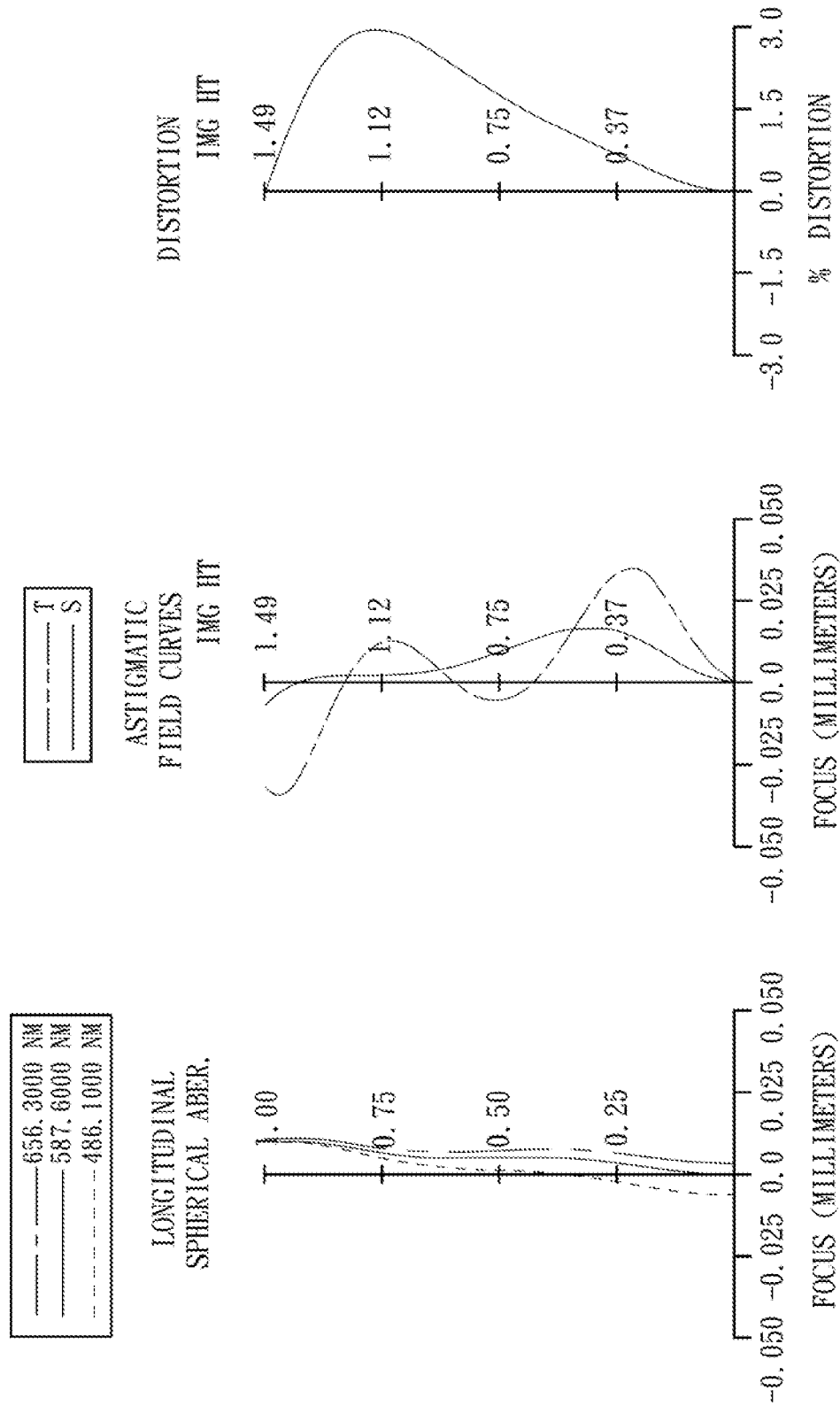
FIG. 24 shows spherical aberration curves, astigmatic field curves and a distortion curve of the optical image capturing system according to the 12th embodiment.

FIG. 23 is a schematic view of an optical image capturing system according to the 12th embodiment of the present disclosure. FIG. 24 shows spherical aberration curves, astigmatic field curves and a distortion curve of the optical image capturing system according to the 12th embodiment. In FIG. 23, the optical image capturing system includes, in order from an object side to an image side, an aperture stop 1200, a first lens element 1210, a second lens element 1220, a third lens element 1230, a fourth lens element 1240, a fifth lens element 1250, an IR-cut filter 1270 and an image plane 1260.

The first lens element 1210 with positive refractive power has a convex object-side surface 1211 and a convex image-side surface 1212. The first lens element 1210 is made of plastic material and has the object-side surface 1211 and the image-side surface 1212 being aspheric.

The second lens element 1220 with negative refractive power has a convex object-side surface 1221 and a concave image-side surface 1222. The second lens element 1220 is made of plastic material and has the object-side surface 1221 and the image-side surface 1222 being aspheric. Furthermore, the object-side surface 1221 of the second lens element 1220 changes from convex at a paraxial region to concave at a peripheral region, and the image-side surface 1222 of the second lens element 1220 changes from concave at a paraxial region to convex at a peripheral region.

The third lens element 1230 with positive refractive power has a concave object-side surface 1231 and a convex image-side surface 1232. The third lens element 1230 is made of plastic material and has the object-side surface 1231 and the image-side surface 1232 being aspheric.

The fourth lens element 1240 with negative refractive power has a concave object-side surface 1241 and a convex image-side surface 1242. The fourth lens element 1240 is made of plastic material and has the abject-side surface 1241 and the image-side surface 1242 being aspheric.

The fifth lens element 1250 with positive refractive power has a convex object-side surface 1251 and a concave image-side surface 1252. The fifth lens element 1250 is made of plastic material and has the object-side surface 1251 and the image-side surface 1252 being aspheric. Furthermore, the fifth lens element 1250 has at least one inflection point on the image-side surface 1252 thereof.

The IR-cut filter 1270 is made of glass material, wherein the IR-cut filter 1270 is located between the fifth lens element 1250 and the image plane 1260, and will not affect the focal length of the optical image capturing system.

The detailed optical data of the 12th embodiment are shown in Table 23 and the aspheric surface data are shown in Table 24 below.

TABLE 23

12th Embodiment
f = 1.95 mm, Fno = 2.40, HFOV = 37.5 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.022 | | | | |
| 2 | Lens 1 | 1.893 | (ASP) | 0.305 | Plastic | 1.530 | 55.8 | 3.29 |
| 3 | | −20.833 | (ASP) | 0.038 | | | | |
| 4 | Lens 2 | 3.383 | (ASP) | 0.237 | Plastic | 1.614 | 25.6 | −37.27 |
| 5 | | 2.869 | (ASP) | 0.130 | | | | |
| 6 | Lens 3 | −6.408 | (ASP) | 0.445 | Plastic | 1.535 | 56.3 | 1.78 |
| 7 | | −0.847 | (ASP) | 0.087 | | | | |
| 8 | Lens 4 | −0.448 | (ASP) | 0.240 | Plastic | 1.632 | 23.4 | −2.20 |
| 9 | | −0.799 | (ASP) | 0.030 | | | | |
| 10 | Lens 5 | 0.474 | (ASP) | 0.288 | Plastic | 1.530 | 55.8 | 4.97 |
| 11 | | 0.456 | (ASP) | 0.500 | | | | |
| 12 | IR-cut filter | Plano | | 0.200 | Glass | 1.517 | 64.2 | — |
| 13 | | Plano | | 0.392 | | | | |
| 14 | Image | Plano | | — | | | | |

Reference wavelength (d-line) is 587.6 nm.

TABLE 24

Aspheric Coefficients

| Surface # | 2 | 3 | 4 | 5 | 6 |
|---|---|---|---|---|---|
| k = | −1.6471E+00 | 2.0000E+01 | −1.4325E+01 | 1.4671E+01 | 1.6243E+01 |
| A4 = | −5.0850E−02 | −7.9328E−01 | −9.7552E−01 | −7.5500E−01 | −2.8928E−01 |
| A6 = | −3.2890E−01 | 2.5218E−01 | −1.2860E−01 | −2.2353E−01 | −3.0029E−01 |
| A8 = | −3.1315E+00 | 2.6375E+00 | 2.2706E+00 | −3.0360E−01 | 5.2963E−01 |

TABLE 24-continued

| Aspheric Coefficients | | | | | |
|---|---|---|---|---|---|
| A10 = | 1.7056E+01 | −9.1995E+00 | −4.2026E+00 | −3.0544E−01 | 9.6134E−01 |
| A12 = | −1.5425E+01 | 1.4070E+01 | 6.8758E+00 | −1.6828E+00 | 2.5288E+00 |
| A14 = | −1.4416E+01 | 6.9803E+01 | −9.9636E+00 | 4.5761E−01 | −3.8765E+00 |
| A16 = | | | | | −1.4026E+00 |

| Surface # | 7 | 8 | 9 | 10 | 11 |
|---|---|---|---|---|---|
| k = | −1.2233E−01 | −4.0044E+00 | −9.7067E−01 | −3.2906E+00 | −2.5082E+00 |
| A4 = | −1.6609E−01 | −3.7924E−01 | 6.6011E−01 | −4.4843E−01 | −4.0693E−01 |
| A6 = | 3.9933E−01 | −4.4298E−01 | −7.8120E−01 | 9.2671E−02 | 2.0462E−01 |
| A8 = | −8.4259E−01 | 2.0173E+00 | 3.9348E−01 | −1.4444E−01 | −5.8224E−02 |
| A10 = | 1.2082E+00 | −6.1436E−01 | 8.6335E−01 | 7.3495E−03 | −8.2144E−03 |
| A12 = | 4.9176E+00 | 1.8775E+00 | 2.8938E−01 | 1.1135E−01 | −3.2535E−03 |
| A14 = | −9.1884E−01 | 2.4626E+00 | −1.0821E−01 | 1.6824E−01 | 5.0877E−03 |
| A16 = | | −5.8025E+00 | −4.4300E−02 | −1.3794E−01 | |

In the optical image capturing system according to the 12th embodiment, the definitions of f, Fno, HFOV, V2, V3, V4, R6, R7, CT3, f1, f2, f3, f4, EPD and Td are the same as those stated in the 1st embodiment with corresponding values for the 12th embodiment. Moreover, these parameters can be calculated from Table 23 and Table 24 as the following values and satisfy the following relationships:

| f (mm) | 1.95 | R7/f | −0.23 |
|---|---|---|---|
| Fno | 2.40 | |f/f2| | 0.052 |
| HFOV (deg.) | 37.5 | f/f4 | −0.886 |
| V4/V3 | 0.42 | |f3/f1| + |f4/f2| | 0.599 |
| (V2 + V4)/V3 | 0.87 | f/EPD | 2.40 |
| R6/CT3 | −1.90 | Td (mm) | 1.80 |

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An optical image capturing system comprising, in order from an object side to an image side:
   a first lens element with positive refractive power having a convex object-side surface and a concave image-side surface;
   a second lens element having refractive power;
   a third lens element having positive refractive power;
   a fourth lens element with negative refractive power having a concave object-side surface and a convex image-side surface, wherein the object-side surface and the image-side surface of the fourth lens element are aspheric; and
   a fifth lens element with refractive power having a concave image-side surface, wherein an object-side surface and the image-side surface of the fifth lens element are aspheric, and the fifth lens element has at least one inflection point on the image-side surface thereof;
   wherein each of the first through fifth lens elements is a single and non-cemented lens element, a focal length of the first lens element is f1, a focal length of the second lens element is f2, a focal length of the third lens element is f3, a focal length of the fourth lens element is f4, a focal length of the optical image capturing system is f, a curvature radius of the object-side surface of the fourth lens element is R7, and the following relationships are satisfied:

$0<|f3/f1|+|f4/f2|<1.0$; and $-1.0<R7/f<0$.

2. The optical image capturing system of claim 1, wherein the fifth lens element has a convex object-side surface.

3. The optical image capturing system of claim 2, wherein the focal length of the optical image capturing system is f, the curvature radius of the object-side surface of the fourth lens element is R7, and the following relationship is satisfied:

$-0.4<R7/f<0$.

4. The optical image capturing system of claim 2, wherein the focal length of the optical image capturing system is f, the focal length of the second lens element is f2, and the following relationship is satisfied:

$0<|f/f2|<0.36$.

5. The optical image capturing system of claim 2, wherein an Abbe number of the third lens element is V3, an Abbe number of the fourth lens element is V4, and the following relationship is satisfied:

$0.30<V4/V3<0.50$.

6. The optical image capturing system of claim 2, wherein the focal length of the first lens element is f1, the focal length of the second lens element is f2, the focal length of the third lens element is f3, the focal length of the fourth lens element is f4 and the following relationship is satisfied:

$0<|f3/f1|+|f4/f2|<0.75$.

7. The optical image capturing system of claim 2, wherein a curvature radius of the image-side surface of the third lens element is R6, a central thickness of the third lens element is CT3, and the following relationship is satisfied:

$-2.7<R6/CT3<-1.0$.

8. The optical image capturing system of claim 2, wherein the object-side surface and the image-side surface of the first lens element to the fifth lens element are aspheric, and the first lens element to the fifth lens element are made of plastic material.

9. The optical image capturing system of claim 2, wherein an axial distance between the object-side surface of the first lens element and the image-side surface of the fifth lens element is Td, and the following relationship is satisfied:

$1.0\ mm<Td<2.8\ mm$.

10. The optical image capturing system of claim 2, wherein the second lens element has a convex object-side surface and a concave image-side surface.

11. The optical image capturing system of claim 10, wherein the object-side surface of the second lens element changes from convex at a paraxial region to concave at a peripheral region, and the image-side surface of the second lens element changes from concave at a paraxial region to convex at a peripheral region.

12. The optical image capturing system of claim 2, wherein the fifth lens element has positive refractive power.

13. The optical image capturing system of claim 1, wherein the focal length of the optical image capturing system is f, the focal length of the fourth lens element is f4, and the following relationship is satisfied:

$-1.2 < f/f4 < -0.5.$

14. The optical image capturing system of claim 1, wherein an Abbe number of the second lens element is V2, an Abbe number of the third lens element is V3, an Abbe number of the fourth lens element is V4, and the following relationship is satisfied:

$0.6 < (V2+V4)/V3 < 1.0.$

15. The optical image capturing system of claim 1, wherein the focal length of the optical image capturing system is f, an entrance pupil diameter of the optical image capturing system is EPD, and the following relationship is satisfied:

$1.2 < f/EPD < 2.1.$

16. The optical image capturing system of claim 1, wherein an axial distance between the object-side surface of the first lens element and the image-side surface of the fifth lens element is Td, and the following relationship is satisfied:

$1.0 \text{ mm} < Td \leq 2.4 \text{ mm}.$

17. An optical image capturing system comprising, in order from an object side to an image side:
 a first lens element with positive refractive power having a convex object-side surface;
 a second lens element having refractive power;
 a third lens element with positive refractive power having a convex image-side surface;
 a fourth lens element with negative refractive power having a concave object-side surface and a convex image-side surface, wherein the object-side surface and the image-side surface of the fourth lens element are aspheric; and
 a fifth lens element with refractive power having a concave image-side surface, wherein an object-side surface and the image-side surface of the fifth lens element are aspheric, and the fifth lens element has at least one inflection point on the image-side surface thereof;
 wherein each of the first through fifth lens elements is a single and non-cemented lens element, a focal length of the first lens element is f1, a focal length of the second lens element is f2, a focal length of the third lens element is f3, a focal length of the fourth lens element is f4, a focal length of the optical image capturing system is f, a curvature radius of the object-side surface of the fourth lens element is R7, and the following relationships are satisfied:

$0 < |f3/f1| + |f4/f2| < 0.75;$ and $-1.0 < R7/f < 0.$

18. The optical image capturing system of claim 17, wherein the second lens element has a convex object-side surface and a concave image-side surface, and the fifth lens element has a convex object-side surface.

19. The optical image capturing system of claim 18, wherein the object-side surface of the second lens element changes from convex at a paraxial region to concave at a peripheral region, and the image-side surface of the second lens element changes from concave at a paraxial region to convex at a peripheral region.

20. The optical image capturing system of claim 17, wherein the focal length of the optical image capturing system is f, the focal length of the second lens element is f2, and the following relationship is satisfied:

$0 < |f/f2| < 0.36.$

21. The optical image capturing system of claim 17, wherein an Abbe number of the third lens element is V3, an Abbe number of the fourth lens element is V4, and the following relationship is satisfied:

$0.30 < V4/V3 < 0.50.$

22. The optical image capturing system of claim 17, wherein the focal length of the optical image capturing system is f, an entrance pupil diameter of the optical image capturing system is EPIC, and the following relationship is satisfied:

$1.2 < f/EPD < 2.1.$

23. The optical image capturing system of claim 17, wherein the fifth lens element has positive refractive power.

24. The optical image capturing system of claim 17, wherein an axial distance between the object-side surface of the first lens element and the image-side surface of the fifth lens element is Td, and the following relationship is satisfied:

$1.0 \text{ mm} < Td < 2.8 \text{ mm}.$

* * * * *